United States Patent
Knudson et al.

(10) Patent No.: US 10,650,086 B1
(45) Date of Patent: May 12, 2020

(54) SYSTEMS, METHODS, AND FRAMEWORK FOR ASSOCIATING SUPPORTING DATA IN WORD PROCESSING

(71) Applicant: Palantir Technologies Inc., Palo Alto, CA (US)

(72) Inventors: Eric Knudson, Washington, DC (US); Eric Jeney, Washington, DC (US); Alex Mark, New York, NY (US); Chris Brahms, Vienna, VA (US); David Skiff, Redwood City, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 190 days.

(21) Appl. No.: 15/714,161

(22) Filed: Sep. 25, 2017

Related U.S. Application Data

(60) Provisional application No. 62/400,511, filed on Sep. 27, 2016, provisional application No. 62/437,189, filed on Dec. 21, 2016.

(51) Int. Cl.
*G06F 17/00* (2019.01)
*G06F 17/22* (2006.01)
(Continued)

(52) U.S. Cl.
CPC ........ *G06F 17/2235* (2013.01); *G06F 17/212* (2013.01); *G06F 17/241* (2013.01)

(58) Field of Classification Search
CPC .................................................. G06F 17/2235
See application file for complete search history.

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 | 9/2014 |
| EP | 1647908 | 4/2006 |

(Continued)

OTHER PUBLICATIONS

"A Quick Guide to UniProtKB Swiss-Prot & TrEMBL," Sep. 2011, pp. 2.

(Continued)

*Primary Examiner* — Mustafa A Amin
(74) *Attorney, Agent, or Firm* — Knobbe, Martens, Olson & Bear LLP

(57) ABSTRACT

Word processing software uses an interactive word processing interface to provide and maintain links between portions of a report document being edited and portions of source documents. This functionality can be natively incorporated within the word processing software or added, such as through a plugin. The word processor creates links between highlighted portions of the report document and source documents or portions of source documents. Links can include unique identifiers stored in a database. Hovering over portions of the report document for which links to sources have been applied causes the source to be displayed and highlighted in a browser interface (and vice versa). The word processing software may also be configured to determine a categorization of the source document or a portion of the source document, and apply that same categorization to the highlighted portion of the report document.

18 Claims, 16 Drawing Sheets

(51) Int. Cl.
*G06F 17/21* (2006.01)
*G06F 17/24* (2006.01)

(56) References Cited

U.S. PATENT DOCUMENTS

| | | | |
|---|---|---|---|
| 5,428,776 | A | 6/1995 | Rothfield |
| 5,542,089 | A | 7/1996 | Lindsay et al. |
| 5,608,899 | A | 3/1997 | Li et al. |
| 5,613,105 | A | 3/1997 | Xbikowski et al. |
| 5,701,456 | A | 12/1997 | Jacopi et al. |
| 5,724,575 | A | 3/1998 | Hoover et al. |
| 5,794,228 | A | 8/1998 | French et al. |
| 5,794,229 | A | 8/1998 | French et al. |
| 5,857,329 | A | 1/1999 | Bingham |
| 5,911,138 | A | 6/1999 | Li et al. |
| 5,918,225 | A | 6/1999 | White et al. |
| 6,208,985 | B1 | 3/2001 | Krehel |
| 6,236,994 | B1 | 5/2001 | Swartz et al. |
| 6,289,334 | B1 | 9/2001 | Reiner et al. |
| 6,311,181 | B1 | 10/2001 | Lee et al. |
| 6,321,274 | B1 | 11/2001 | Shakib et al. |
| 6,643,613 | B2 | 11/2003 | McGee et al. |
| 6,745,382 | B2 | 6/2004 | Zothner |
| 6,851,108 | B1 | 2/2005 | Syme et al. |
| 6,857,120 | B1 | 2/2005 | Arnold et al. |
| 6,877,137 | B1 | 4/2005 | Rivette et al. |
| 6,976,024 | B1 | 12/2005 | Chavez et al. |
| 7,028,223 | B1 | 4/2006 | Kolawa et al. |
| 7,085,890 | B2 | 8/2006 | Kashyap |
| 7,155,728 | B1 | 12/2006 | Prabhu et al. |
| 7,216,133 | B2 | 5/2007 | Wu et al. |
| 7,406,592 | B1 | 7/2008 | Polyudov |
| 7,519,589 | B2 | 4/2009 | Charnock et al. |
| 7,546,353 | B2 | 6/2009 | Hesselink et al. |
| 7,610,290 | B2 | 10/2009 | Kruy et al. |
| 7,627,489 | B2 | 12/2009 | Schaeffer et al. |
| 7,783,679 | B2 | 8/2010 | Bley |
| 7,853,573 | B2 | 12/2010 | Warner et al. |
| 7,877,421 | B2 | 1/2011 | Berger et al. |
| 7,908,521 | B2 | 3/2011 | Sridharan et al. |
| 7,979,424 | B2 | 7/2011 | Dettinger et al. |
| 8,073,857 | B2 | 12/2011 | Sreekanth |
| 8,103,962 | B2 | 1/2012 | Embley et al. |
| 8,417,715 | B1 | 4/2013 | Bruckhaus et al. |
| 8,429,194 | B2 | 4/2013 | Aymeloglu et al. |
| 8,433,702 | B1 | 4/2013 | Carrino et al. |
| 8,499,287 | B2 | 7/2013 | Shafi et al. |
| 8,560,494 | B1 | 10/2013 | Downing |
| 8,639,552 | B1 | 1/2014 | Chen et al. |
| 8,799,867 | B1 | 8/2014 | Peri-Glass et al. |
| 8,909,597 | B2 | 12/2014 | Aymeloglu et al. |
| 8,924,429 | B1 | 12/2014 | Fisher et al. |
| 8,935,201 | B1 | 1/2015 | Fisher et al. |
| 9,031,981 | B1 | 5/2015 | Potter et al. |
| 9,105,000 | B1 | 8/2015 | White et al. |
| 9,292,388 | B2 | 3/2016 | Fisher et al. |
| 9,330,120 | B2 | 5/2016 | Colgrove et al. |
| 9,348,677 | B2 | 5/2016 | Marinelli, III et al. |
| 9,378,526 | B2 | 6/2016 | Sampson |
| 2002/0184111 | A1 | 12/2002 | Swanson |
| 2003/0004770 | A1 | 1/2003 | Miller et al. |
| 2003/0023620 | A1 | 1/2003 | Trotta |
| 2003/0105833 | A1 | 6/2003 | Daniels |
| 2003/0212670 | A1 | 11/2003 | Yalamanchi et al. |
| 2004/0088177 | A1 | 5/2004 | Travis et al. |
| 2004/0098731 | A1 | 5/2004 | Demsey et al. |
| 2004/0103088 | A1 | 5/2004 | Cragun et al. |
| 2004/0126840 | A1 | 7/2004 | Cheng et al. |
| 2004/0139212 | A1 | 7/2004 | Mukherjee et al. |
| 2004/0153837 | A1 | 8/2004 | Preston et al. |
| 2004/0193608 | A1 | 9/2004 | Gollapudi et al. |
| 2004/0205514 | A1* | 10/2004 | Sommerer ............ G06F 17/212 715/205 |
| 2004/0254658 | A1 | 12/2004 | Sherriff et al. |
| 2004/0260702 | A1 | 12/2004 | Cragun et al. |
| 2005/0004911 | A1 | 1/2005 | Goldberg et al. |
| 2005/0021397 | A1 | 1/2005 | Cui et al. |
| 2005/0120080 | A1 | 6/2005 | Weinreb et al. |
| 2005/0183005 | A1 | 8/2005 | Denoue et al. |
| 2005/0226473 | A1 | 10/2005 | Ramesh |
| 2005/0278286 | A1 | 12/2005 | Djugash et al. |
| 2006/0004740 | A1 | 1/2006 | Dettinger et al. |
| 2006/0064394 | A1* | 3/2006 | Dettinger ............... G06F 16/955 |
| 2006/0070046 | A1 | 3/2006 | Balakrishnan et al. |
| 2006/0074967 | A1 | 4/2006 | Shaburov |
| 2006/0080616 | A1 | 4/2006 | Vogel et al. |
| 2006/0116991 | A1 | 6/2006 | Calderwood |
| 2006/0129992 | A1 | 6/2006 | Oberholtzer et al. |
| 2006/0142949 | A1 | 6/2006 | Helt |
| 2006/0209085 | A1 | 9/2006 | Wong et al. |
| 2006/0271838 | A1 | 11/2006 | Carro |
| 2006/0271884 | A1 | 11/2006 | Hurst |
| 2006/0288046 | A1 | 12/2006 | Gupta et al. |
| 2007/0005582 | A1 | 1/2007 | Navratil et al. |
| 2007/0027851 | A1 | 2/2007 | Kruy et al. |
| 2007/0094248 | A1 | 4/2007 | McVeigh et al. |
| 2007/0113164 | A1 | 5/2007 | Hansen et al. |
| 2007/0150805 | A1 | 6/2007 | Misovski |
| 2007/0168336 | A1 | 7/2007 | Ransil et al. |
| 2007/0178501 | A1 | 8/2007 | Rabinowitz et al. |
| 2007/0192281 | A1 | 8/2007 | Cradick et al. |
| 2007/0260582 | A1 | 11/2007 | Liang |
| 2008/0126344 | A1 | 5/2008 | Hoffman et al. |
| 2008/0126951 | A1 | 5/2008 | Sood et al. |
| 2008/0155440 | A1 | 6/2008 | Trevor et al. |
| 2008/0196016 | A1 | 8/2008 | Todd |
| 2008/0201313 | A1 | 8/2008 | Dettinger et al. |
| 2008/0215543 | A1 | 9/2008 | Huang et al. |
| 2008/0267386 | A1 | 10/2008 | Cooper |
| 2009/0006150 | A1 | 1/2009 | Prigge et al. |
| 2009/0007056 | A1 | 1/2009 | Prigge et al. |
| 2009/0043762 | A1 | 2/2009 | Shiverick et al. |
| 2009/0055487 | A1 | 2/2009 | Moraes et al. |
| 2009/0083275 | A1 | 3/2009 | Jacob et al. |
| 2009/0094217 | A1 | 4/2009 | Dettinger et al. |
| 2009/0144747 | A1 | 6/2009 | Baker |
| 2009/0161147 | A1 | 6/2009 | Klave |
| 2009/0172674 | A1 | 7/2009 | Bobak et al. |
| 2009/0187556 | A1 | 7/2009 | Ross et al. |
| 2009/0193012 | A1 | 7/2009 | Williams |
| 2009/0199047 | A1 | 8/2009 | Vaitheeswaran et al. |
| 2009/0248721 | A1 | 10/2009 | Burton et al. |
| 2009/0282068 | A1 | 11/2009 | Shockro et al. |
| 2009/0299830 | A1 | 12/2009 | West et al. |
| 2010/0011282 | A1 | 1/2010 | Dollard et al. |
| 2010/0070464 | A1 | 3/2010 | Aymeloglu et al. |
| 2010/0073315 | A1 | 3/2010 | Lee et al. |
| 2010/0082671 | A1 | 4/2010 | Li et al. |
| 2010/0145902 | A1 | 6/2010 | Boyan et al. |
| 2010/0161646 | A1 | 6/2010 | Ceballos et al. |
| 2010/0169376 | A1 | 7/2010 | Chu |
| 2010/0169405 | A1 | 7/2010 | Zhang |
| 2010/0199167 | A1 | 8/2010 | Uematsu et al. |
| 2010/0313119 | A1 | 12/2010 | Baldwin et al. |
| 2011/0035396 | A1 | 2/2011 | Merz et al. |
| 2011/0041084 | A1 | 2/2011 | Karam |
| 2011/0066497 | A1 | 3/2011 | Gopinath et al. |
| 2011/0074811 | A1 | 3/2011 | Hanson et al. |
| 2011/0093490 | A1 | 4/2011 | Schindlauer et al. |
| 2011/0131547 | A1 | 6/2011 | Elaasar |
| 2011/0145401 | A1 | 6/2011 | Westlake |
| 2011/0208822 | A1 | 8/2011 | Rathod |
| 2011/0252282 | A1 | 10/2011 | Meek et al. |
| 2011/0258216 | A1 | 10/2011 | Supakkul et al. |
| 2011/0270871 | A1 | 11/2011 | He et al. |
| 2011/0321008 | A1 | 12/2011 | Jhoney et al. |
| 2012/0078595 | A1 | 3/2012 | Balandin et al. |
| 2012/0102022 | A1 | 4/2012 | Miranker et al. |
| 2012/0159449 | A1 | 6/2012 | Arnold et al. |
| 2012/0173381 | A1 | 7/2012 | Smith |
| 2012/0174057 | A1 | 7/2012 | Narendra et al. |
| 2012/0188252 | A1 | 7/2012 | Law |
| 2012/0284719 | A1 | 11/2012 | Phan et al. |
| 2013/0024268 | A1 | 1/2013 | Manickavelu |

(56) References Cited

U.S. PATENT DOCUMENTS

| | | | |
|---|---|---|---|
| 2013/0024731 | A1 | 1/2013 | Shochat et al. |
| 2013/0054551 | A1 | 2/2013 | Lange |
| 2013/0086482 | A1 | 4/2013 | Parsons |
| 2013/0096968 | A1 | 4/2013 | Van Pelt et al. |
| 2013/0198624 | A1 | 8/2013 | Aymeloglu et al. |
| 2013/0225212 | A1 | 8/2013 | Khan |
| 2013/0226944 | A1 | 8/2013 | Baid et al. |
| 2013/0232220 | A1 | 9/2013 | Sampson |
| 2014/0012886 | A1 | 1/2014 | Downing et al. |
| 2014/0074888 | A1 | 3/2014 | Potter et al. |
| 2014/0108074 | A1 | 4/2014 | Miller et al. |
| 2014/0115589 | A1 | 4/2014 | Marinelli, III et al. |
| 2014/0115610 | A1 | 4/2014 | Marinelli, III et al. |
| 2014/0214579 | A1 | 7/2014 | Shen et al. |
| 2014/0244388 | A1 | 8/2014 | Manouchehri et al. |
| 2015/0112641 | A1 | 4/2015 | Faraj |
| 2015/0269030 | A1 | 9/2015 | Fisher et al. |
| 2015/0278169 | A1* | 10/2015 | Vanderport ......... G06F 17/2235 715/208 |
| 2016/0026923 | A1 | 1/2016 | Erenrich et al. |
| 2016/0162458 | A1* | 6/2016 | Munro .................... G06F 16/35 715/230 |
| 2016/0210468 | A1* | 7/2016 | Turner ................ G06F 21/6218 |
| 2016/0239565 | A1* | 8/2016 | Falkner ................ G06F 16/345 |
| 2018/0025659 | A1* | 1/2018 | Liu ........................ G09B 5/065 434/365 |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

"A Tour of Pinboard," <http://pinboard.in/tour> as printed May 15, 2014 in 6 pages.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276-286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"The FASTA Program Package," fasta-36.3.4, Mar. 25, 2011, pp. 29.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
LexisNexis, "Learning LexisNexis—An in-depth guide to using lexis.com," LexisNexis, 2009, 40 pages.
LexisNexis, "Lexis Advance—'Copy Citation' Feature," LexisNexis, printed Sep. 15, 2016, 1 page.
LexisNexis, "Lexis Advance—Quick Reference Guide," LexisNexis, 2016, 20 pages.
LexisNexis, "Lexis Advance—User Guide," LexisNexis, 2013, 38 pages.
LexisNexis, "Lexis Advance—User Guide," LexisNexis, created Apr. 12, 2016, 125 pages.
LexisNexis, "LexisNexis Academic—User Guide," LexisNexis, created Oct. 4, 2002 (as indicated by the PDF file metadata), 37 pages.
LexisNexis, "Paralegal Student User's Guide," LexisNexis, 2012, 28 pages.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.

(56) References Cited

OTHER PUBLICATIONS

Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Westlaw, "Tips and Tricks to Get You Started on Westlaw—Quick Reference Guide," Thomson Reuters, 2016, 4 pages.
Westlaw, "Using Keycite on Westlaw," Thomson Reuters, Jun. 2009, 46 pages.
Westlaw, "Westlaw Research Guide—Professional Legal Research," Thomson West, 2008, 32 pages.
WestlawNext, "Getting Started with Online Research Using WestlawNext," Thomson Reuters, 2014, 36 pages.
WestlawNext, "Introduction to Legal Research on WestlawNext—WestlawNext Patron Access," Thomson Reuters, 2011, 31 pages.
WestlawNext, "WestlawNext Guide for Paralegals—Retrieving Documents on WestlawNext," Thomson Reuters, Oct. 2014, 39 pages.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.

* cited by examiner

| Filter soruces | ◯ Show Histogram | ⊛ New Source |

1 cited sources 528 # FOOTNOTES▼

④ C4 Admin, Doc. #001, "Document 1 title", MM/DD/YY, Multiple Sources — 530

∨ ④ Admin, Doc. #002, "Document 2 title", MM/DD/YY, Multiple Sources

∨ ④ SET CLASSIFICATION
Admin, Doc. #002, "Document 2 title", MM/DD/YY, Multiple Sources ④ C3 Admin, Doc. #002, "Document 2 title", MM/ | All Folders ▼ | 534 | New Folder
532 (1 document)

∨ ④ C4 Wikipedia, N/A, "Lorem ipsum", MM/DD/YY

536 "Nulla dignissim sit amet ipsum id prottor"

538 Lorem ipsum filler dolor sit filler amet, consectetur filler adipiscing elit. Integer nec odio. Praesent libero. Sed cursus ante dapibus diam. Sed nisi.Nulla quis sem at nibh elementum imperdiet.Duis sagittis ipsum.

▢ Cited to whole document.
▢ Cited to whole document.

④ C4 Wikipedia, N/A, "Lorem ipsum", MM/DD/YY

1 background reference NAME▼

◈ C1 (Personal) User, Doc. #003, "Personal Examples", MM/DD/YY, News

SYSTEMS, METHODS, AND FRAMEWORK FOR ASSOCIATING SUPPORTING DATA IN WORD PROCESSING

CROSS-REFERENCE TO RELATED APPLICATIONS

This disclosure references various features of and claims priority to U.S. Provisional Patent Application No. 62/400,511, which was filed on Sep. 27, 2016, and to U.S. Provisional Patent Application No. 62/437,189, which was filed on Dec. 21, 2016. The entire disclosure of these provisional applications are hereby made a part of this specification as if set forth fully herein and is incorporated by reference for all purposes, for all that they contain. Any and all applications for which a foreign or domestic priority claim is identified in the Application Data Sheet as filed with the present application are hereby incorporated by reference under 37 CFR 1.57.

BACKGROUND

Embodiments of the present disclosure generally relate to improvements to the production, storage, and manipulation of text on a computer or word processor. More specifically, embodiments of the present disclosure relate to improvements in word processing for creating associations between portions of a document being edited in a word processor and supporting data from other documents.

Users of computer-based word processing software frequently use citations or footnotes to the contents of other documents in order to provide references or support for factual claims. For example, a user may write a report document on a topic that relies on supporting evidence provided in source documents (other documents, websites, and so forth). However, the user may have to manually enter these citations, footnotes, and references which can be laborious and error-prone process. In addition, a reader of the report document may wish to verify statements in the report by directly viewing the supporting evidence provided in any referenced source documents. In such a scenario, the reader may have to manually look up each of the referenced source documents based on the citations, footnotes, and references provided in the report document, which can also be a laborious and time-consuming process.

Furthermore, the drafting of a report document may involve the work of more than one individual. For example, there may be multiple documents prepared by multiple individuals and the multiple documents may be stitched together into a single report document. Furthermore, a report document can go through many drafts and revisions at the hands of many individuals. During this complex writing process, paragraphs frequently get revised and re-ordered. There can be a loss in fidelity on supporting evidence for the claims made in the report document, such that it can be difficult to know if a statement is true, what evidence supports that statement, and where that evidence can be found.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to solutions for enabling word processing software with an interactive word processing interface (e.g., a user interface for generating or editing a document) to provide and maintain links between portions of a report document and portions of one or more source documents. These links allow portions of the report document to reference back to supporting evidence in the source documents.

This functionality can be natively incorporated within the word processing software itself or it can be added to existing word processing software, such as through a plugin. For example, in some embodiments the word processing software itself can be modified to have an additional "browser interface" (e.g., a software user interface rendered in a web browser) in a sidebar for displaying source documents. This additional browser interface may be in communication with the interactive word processing interface in order to manage links between source documents and a report document displayed through the interactive word processing interface. In other embodiments, the browser interface may be provided as an add-in or plugin for the word processing software. The browser interface would similarly be in communication with the interactive word processing interface provided by the word processing software. The word processing software or environment, which includes the word processing interface and the additional browser interface, may be referred to in this disclosure as a word processing system or a computing system.

In some embodiments, a user can highlight portions of the report document within the word processing software (for example, through the interactive word processing interface), and then select source documents or portions of source documents (for example, through the browser interface) and create a link between the selected portions of the report document and the source document. Upon creating the link, a unique identifier is embedded in the report document that can be used to link back to the source document or portions of the source document. More specifically, the embedded link may be used to fetch the corresponding portion of the source document being referenced.

In some embodiments, the word processing software may also be configured to determine a categorization of the source document or a portion of the source document, and apply that same categorization to the highlighted portion of the report document.

In some embodiments, hovering over portions of the report document for which links to sources have been applied causes the source to be displayed and highlighted in the browser interface (and vice versa). In some embodiments, a user may be able to view all a compilation or list of all the portions of source documents that are linked in the report document. This enables the user to quickly navigate among information within the various source documents being cited and efficiently evaluate the supporting evidence within those source documents.

Further, as described herein, the word processing software or environment may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 2-4, 5A-5C, and 6 illustrate examples of interactive word processing interfaces and corresponding browser interfaces, according to embodiments of the present disclosure.

FIGS. 8-10 and 11A-11B illustrate examples of interactive word processing interfaces and corresponding browser interfaces, according to embodiments of the present disclosure.

DETAILED DESCRIPTION

Figure 1A:
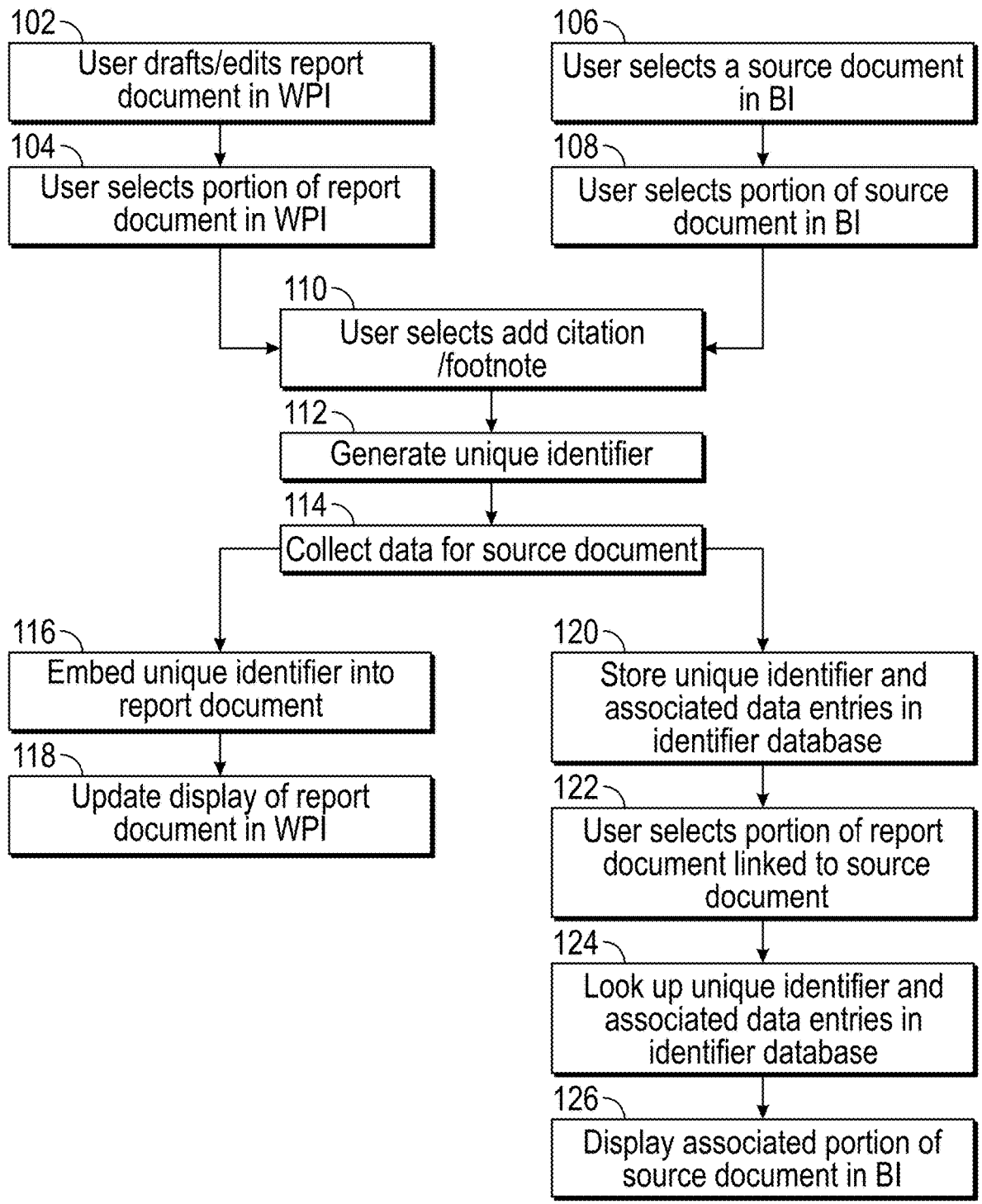
FIG. 1A is a flowchart of an example method of linking a portion of a report document and a portion of a source document and utilizing the link, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Word processing tools are some of the greatest inventions. For example, the typewriter has been hailed as one of the greatest inventions of all time. See, e.g., Philbin, Tom. "*The 100 Greatest Inventions of All Time: A Ranking Past and Present.*" Citadel Press, 2005, pp. 211-222. Indeed, an "inventive genius gave to the world that wonderful mechanism known as the typewriter. It was his brain that conceived the main features of an invention which has lightened the labor and added to the comfort and happiness of countless thousands of young men and women . . . " Weller, Chas E. Secretary National Shorthand Reporters' Association. "The Early History of the Typewriter." Chase & Shepherd Printers, La Porte, Indiana, 1918. Pp. 77. Later word processing inventions include improvements to typewriters (e.g., erasing mistakes) and later transitions to digital word processors (e.g., digital keyboard, monitors, and digital word editors). These inventions digitize, automate, speed up, or improve the functionality of mundane tasks otherwise performed by manual labor. In more recent decades, some improvements have been made in the digital processing logic and programs associated with word processing instead of physical additions to typewriter parts. While many aspects of word processing have been improved by such historical inventions, there remains room for further improvement.

Current means of citing and managing source documents for a report document typically require a user to manually cite or investigate source documents, as well as search through each source document to locate the portion of the source document being relied upon as supporting evidence. Repeating this process for each source document consumes time and resources and can be impractical, especially for a reader of the report document with limited time to dedicate to verifying supporting evidence.

For example, in some U.S. jurisdictions, the Courts require briefs to be electronically filed along with supporting documents cited in those briefs. The Honorable Judges and their clerks may print out all the documents, and as they read through the briefs, manually retrieve and find each cited section in volumes of exhibits. When reading electronically, the briefs their cited exhibits may need to be individually retrieved from a database, such as PACER, for opening and viewing one by one. Furthermore, when an exhibit is retrieved, it may be necessary to scroll through multiple pages of transcripts, case law, or documents confusingly paginated in multiple formats (e.g., original document page 10, PLFBATES #11, Exh A-12) to find the page of a quote that is cited in a brief. Such work can be time consuming, and multiple revisions of the submission rules and technological requirements have not improved the efficiency. Accordingly, judicial bodies may have long felt inefficiencies in the current process and regularly attempt to improve efficiency in the document management, viewing, and processing fields.

Thus, a need exists in word processing for enabling users to write reports that are deeply tied to data and analytical work product within a database, such as by allowing reports to cite to supporting evidence/source documents or portions of those documents, and enabling users to quickly view and retrieve those cited source documents by viewing the reports faster than manually retrieving and faster than manually finding cited sections in the reports. In addition to the integration of report documents and the supporting evidence of one or more source documents, there is also a need for tracking and managing the categorization of the contents of the report document and the source documents.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Computer-based data systems, such as relational database management systems, typically organize data sets according to a fixed structure of tables and relationships. The structure may be described using an ontology, embodied in a database schema, comprising a data model that is used to represent the structure and reason about objects in the structure.

An ontology of a database is normally fixed at the time that the database is created, for example, some database schema include a predefined set of objects and relationships that cannot be easily edited. Changes to the ontology represented by the schema can be extremely disruptive to the database system, and may require user intervention by an administrator to modify tables or relationships, or to create new tables or relationships.

However, the volumes of data in high-scale datasets are cumbersome to store, manage and curate in a structure described using an ontology. As a result, high-scale data sets may comprise growing volumes of data that require vast storage space. The inflexibility of a typical database ontology therefore presents a set of unique technical challenges when attempts are made to curate ontologies based on specifications and requirements and when incorporating high-scale datasets.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs (e.g., selections of portions of a report or a source document), translation and delivery of those inputs to various system components, automatic and dynamic execution of complex processes in response to the input delivery (for example, the generation of a unique identifier for linking a portion of a report document to a portion of a source document), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Interactive Word Processing Interface: A graphical user interface of a software program configured to perform the tasks of composition, editing, formatting, and/or printing of electronic documents by allowing a user to interactively modify the contents and/or style of the document. The interactive word processing interface may be of the what-you-see-is-what-you-get (WYSIWYG) variety, such that the interface denotes the representation of text on a display in a form closely corresponding to its appearance on a printout. Some examples of interactive word processing interfaces include Microsoft Word, OpenOffice, Google Docs, and so forth. A user interface can include multiple interactive word processing interfaces as different portions or sections of the user interface. Each portion or section can include sub-portions or sub-sections, each of which may include related or different functionality Report Document: An electronic document, record, or file that provides information and is modifiable in an interactive word processing interface. A report document may contain links or embedded unique identifiers which allow for the association of data outside the report document, such as data from source documents. For example, a report document may provide a detailed report on ocean mammals and contain links or embedded unique identifiers for associating data from the various sources (e.g., Wikipedia articles on various ocean mammals) used to compile the report. While the present disclosure refers to report "documents" for convenience, the systems, methods, and functionality described herein may similarly be applied to any type of electronic data items, such as any type of data files, media files, etc.

Source Document: An electronic document, record, or file that provides supporting evidence or data that is associated with, and/or used in, the report document. For example, a report document may contain a claim that is supported by factual data in a supporting document. A source document may also include charts, graphs, images, and so forth, which can be linked to portions of the report document. While the present disclosure refers to source "documents" for convenience, the systems, methods, and functionality described herein may similarly be applied to any type of electronic data items, such as any type of data files, media files, etc. (e.g., data objects representing persons or properties associated with persons, maps or graphs, etc.).

Source: A source document or a portion of a source document. A source can be referenced or linked to multiple times in a report document.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Browser Interface: A graphical user interface (e.g., as rendered by a web browser or other appropriate rendering device, software application, etc.) through which the source documents, or portions of source documents are displayed. The browser interface may be configured to allow a user to highlight portions of a source document displayed through the browser interface or associate portions of the source document with a report document being displayed on an interactive word processing user interface. The browser interface may, in various implementations, enable various other functionalities. For example, the browser interface may be configured to render any suitable user interface data, such as web pages, or provide any interactive functionality to a user. The browser interfaces described herein may, in some implementations, comprise one or more portions or sections of a user interface comprising multiple portions or sections (each of which may include related or different functionality).

Unique Identifier: A data item within a report document that is uniquely associated with a set of data entries within an identifier database. The unique identifier may be used as a link embedded within the report document for looking up the associated set of data entries within the identifier database. The unique identifier can be generated in response to a request to link the report document with the associated set of data entries. In another implementation the unique identifier may be used to reference additional data stored as variables (or other data items) within the report document (as described below).

Identifier Database: A database containing data entries associated with various unique identifiers, which serves to associate portions of the report document with various aspects of a source document (e.g., specific sections, authors, metadata, and so forth). As described below, in some implementations the identifier database, or some version thereof, may be stored in the report document.

Link: A connection or association between a portion of a report document and a portion of a source document. The link may include a unique identifier.

Categorization: A label or tag applicable to a portion of a document or the document in its entirety. A portion of a document or the document may have more than one categorization applied to it. Within the context of the disclosed word processing system, portions of a document or the document may have one or more categorizations. In some embodiments, the categorization of a portion of a source document that is linked to a portion of the report document may be carried-over and applied to that portion of the report document. The categorization of a block of text may be displayed prior to that text block, whereas the categorization of a document may be displayed within the document header. Examples of categories include categories for permission levels, access control levels, privileges classes (e.g., privileged, non-privileged), confidentiality levels (e.g., confidential, public, attorney eyes only), user groups, etc.

Ontology: Stored information that provides a data model for storage of data in one or more databases. For example, the stored data may comprise definitions for object types and property types for data in a database, and how objects and properties may be related.

Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Example Word Processing Workflow

FIG. 1A is a flowchart of an example method of linking a portion of a report document and a portion of a source document and utilizing the link, according to an embodiment of the present disclosure.

As shown in the embodiment of FIG. 1, at block 102 a user may draft or edit a report document in the interactive word processing interface of the word processing software.

At block 104, the user may select a portion of the report document in the interactive word processing interface. For example, the user may highlight a block of text within the report document. However, the selected portion of the report document does not necessarily need to be a block of text; the selected portion could be an image, chart, table, graph, or so forth. The user selects a portion of the report document that the user desires to link to a source.

At block 106, the user selects a source document in a browser interface. In some embodiments, the browser interface may be displayed simultaneously and/or along-side the interactive word processing interface. The browser interface may be configured to allow a user to search, browse, and/or select one or more source documents in a browser interface. In particular, the browser interface may allow a user to enter a search string for searching a database of source documents based on the contents of the source documents or metadata/properties associated with the source documents (e.g., author). The search results may show a summary or snippet of some source documents that meet the search criteria, and the user may be able to select a source document among the search results.

The browser interface is capable of communicating with the word processing interface. The browser interface can be natively incorporated within the word processing software itself or it can be added to existing word processing software, such as through a plugin. For example, in some embodiments the word processing software itself can be modified to have an additional browser interface in a sidebar for displaying source documents, while in other embodiments, the browser interface may be provided as an add-in or plugin for the word processing software. The browser interface may be in a web application programmed in a first language, such as HTML, JavaScript, etc. The interactive word processing interface may be may be programmed in a second language. One or more functions in a linking language (such as Visual Studio Tools Office "VSTO") executable in the interactive word processing interface can be attached to the web application as a translator layer so that the browser interface can send function calls to the interactive word processing interface, and the interactive word processing interface can send function calls to the web application. The interactions, functions, and linking between the two interfaces can be accomplished through any form of application program interface "API."

At block 108, the user may select a portion of a source document in the browser interface. For example, the user may highlight a block of text within the source document. However, the selected portion of the source document does not necessarily need to be a block of text; the selected portion could be an image, chart, table, graph, or so forth. The user selects a portion of the source document that the user desires to link to the portion of the report document selected at block 104.

At block 110, once the user has selected a portion of the report document and a portion of the source document, the user may choose to link those portions together by adding a citation or a footnote. In some embodiments, the option to add a citation or a footnote may be provided in the browser interface. In other embodiments, the option to add a citation or a footnote may be provided in the interactive word processing interface.

As shown in the figure, the options of either associating the source as a citation or a footnote may represent a simplification of the types of relationships available. In some embodiments of the word processing system, there may be four types of relationships possible. For example, the user may be able to add a source as a background reference in the works cited, add a source as a footnote, add a specific source quote as a footnote, or embed a source quote as text in the document, and/or the like. The figure is intended to be non-limiting with regards to the types of relationships and provides simplification for the purposes of facilitating understanding. The citation or footnote can be formatted according to a standard citation format such as MLA, APA, Bluebook, a custom citation format, etc. The citation formats can be built-in and the interface may present a pop up dialog box for the user to select the citation format. Based on a regex or metadata analysis of the source, the citation for the source can be generated on the citation format.

At block 112, once the user has chosen to link selected portions of the report document and the source document, the system may generate a unique identifier. The unique identifier may be in any format that is uniquely identifiable within a database. For example, the unique identifier may be a combination of characters (e.g., letters, numbers, symbols, and so forth). In some embodiments, the unique identifier may be a number that is sequentially generated (e.g., "00001", then "00002", then "00003", and so forth). In some embodiments, the unique identifier can be automatically generated in response to the user's selection to add the citation/footnote in block 110. In some embodiments, the unique identifier can act as a link between a document and a source.

At block 114, the system may collect data associated with the source document. The data collected may include the portion or snippet of the source document being highlighted, along with properties or metadata associated with the source document. For example, the system may determine the source document's title, the author of the source document, the overall categorization level of the source document, the categorization level of the selected portion of the source document, the link to—or address of—the source document, a publication date, and any additional sources that are referenced in the source document.

At block 116, the system may embed the unique identifier into the report document in order to link the selected portion of the report document with the selected portion of the source document. In some embodiments, the unique identifier can be embedded as hidden text, invisible text, or metadata in the interactive word processing interface. This can be performed automatically in response to the user's selection to add the citation/footnote in block 110 without requiring further input from the user. In some embodiments, the system may embed the unique identifier into the report document automatically in response to the user's selection made in a browser interface.

At block 118, the display of the report document may be updated in the interactive word processing interface to show an indication that the selected portion of the report document is now linked to the selected portion of the source document (e.g., by underlining or a hyperlink, etc.).

At block 120, the system may store, in an identifier database, the unique identifier along with the associated data entries for the source document collected at block 114. The identifier database may be structured in a way such that the unique identifier serves as a pointer, reference, or other means for looking up the data entries for the source document associated with that unique identifier. As just one example, the identifier database may be structured as a table with each individual row corresponding to a different unique identifier, and the various columns in the table could contain information for the source document associated with each unique identifier. By storing identifier information in the identifier database instead of in the report document, the file size of a report document can be reduced.

In some embodiments, the identifier database, or some version thereof, is stored in the report document. For example, in some implementations the unique identifier may be used to reference additional data entries stored as variables (or other data items) directly within the report document. Advantageously, storing the additional data in the report document eliminates the need for an additional data store. However, implementations that store the identifier database separate from the report document also have advantages in that if there are changes to, e.g., source documents/data (e.g., a property associated with the source data, or a permission associated with the source data), such changes can be reflected in the report document (whereas when such source data is stored in the report document directly the changes may not be reflected).

At block 122, the user may then select the portion of the report document linked to the source document within the interactive word processing interface. This can be done, for example, by hovering the mouse cursor over that portion of the report document, or by clicking somewhere within that linked portion of the report document. In some implementations, the system may insert a hyperlink in the report document in the portion that is linked.

At block 124, the system may retrieve the embedded unique identifier associated with the selected portion of the report document and use it to look up data entries within the identifier database. The data entries would include the information associated with the source document collected at block 114.

At block 126, the system would use the data entries associated with the source document in order to identify the source document, retrieve the source document, and even identify the exact portion of the source document that was linked to the selected portion of the report document. That linked portion of the source document can be displayed to the user, such as through the browser interface. Thus, by selecting or hovering a portion of the report document that has been linked to a source, the system may automatically retrieve the linked portion of the source document and display it on the browser interface.

Figure 1B:
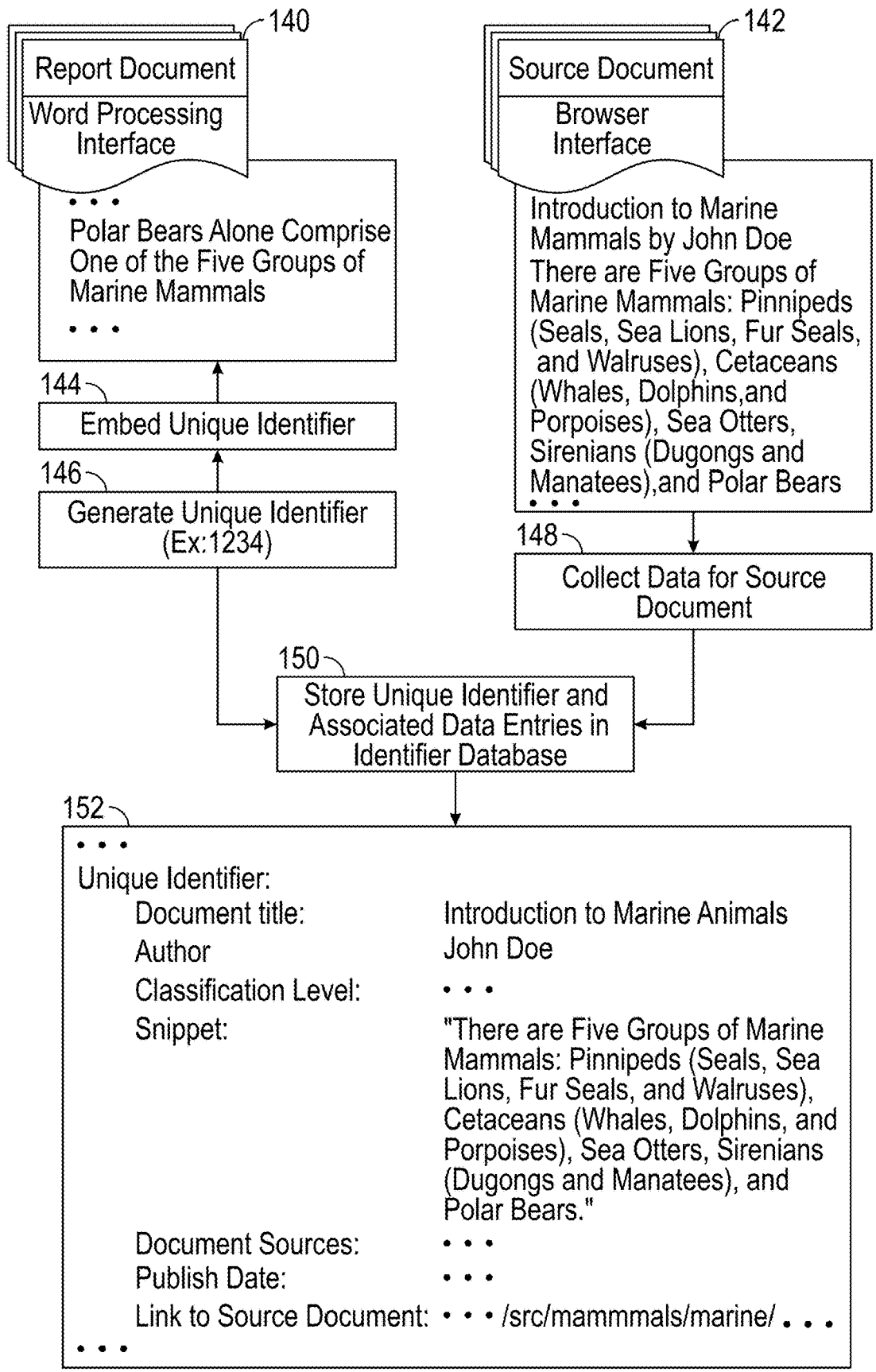
FIG. 1B illustrates an example of a link between a portion of a report document and a portion of a source document and how that link may be stored, according to an embodiment of the present disclosure.

FIG. 1B illustrates an example of a link between a portion of a report document and a portion of a source document and how that link may be stored, according to an embodiment of the present disclosure.

The figure illustrates an example report document 140 displayed through a word processing interface. This report document 140 can be regarding any topic and may be in any format, but for example purposes, a snippet of the report document 140 is shown which represents a factual claim regarding marine mammals.

Also shown is an example source document 142 displayed through a browser interface. This source document 142 may also be regarding any topic and may be in any format, but for example purposes, is a document discussing marine mammals and contains supporting evidence for verifying the factual claim made in the report document 140. In some embodiments, the word processing interface and the browser interface may be displayed simultaneously and/or alongside each other, so that the user can view the report document 140 and the source document 142 at the same time.

In this illustrated example, a user is presumed to have selected the illustrated portion of the report document 140 and the illustrated paragraph of the source document 142 in order for the source to serve as a reference for the selected portion of the report document. In some embodiments, the user may be presented with an option to add a citation or footnote. The user, upon selecting one of the presented options, triggers the system to create the necessary link for associating the selected portion of the source document 142 to the selected portion of the report document 140.

In order to do so, at block 148, the system collects data associated with the source document 142. The content of the source document 142 is illustrated as including a title and an author. However, the source document 142 may have additional information that is viewable or not viewable to the user, such as properties and/or metadata. For example, there may be a categorization level associated with the source document 142 or the selected portion of the source document 142, a list of sources referenced in source document 142, a publication date or modification date for the source document 142, a link or address for retrieving the source document 142, and so forth. All of the relevant information for the source document 142 is collected.

At block 146, the system generates a unique identifier to be used in the link. This unique identifier may be generated through any of the means previously described, and it may consist of any unique arrangement or combination of characters. The unique identifier "1234" is used as an illustrated example in the figure.

At block 144, the system embeds the unique identifier "1234" into the report document 140. A single report document can contain many references to source documents, which can result in many unique identifiers being embedded into a single report document. Thus, each individual unique identifier is embedded in a manner that associates it with the corresponding selected portion of the report document. For example, the unique identifier "1234" may be embedded right before, or right after, the selected portion of the report document 140.

At block 150, the system would also store the unique identifier and the associated data entries in the identifier database, as previously discussed in regards to block 120 of FIG. 1A. An example identifier database 152 is illustrated as having a number of data entries under the unique identifier "1234", including the title of the source document 140, the author of the source document 140, the categorization level of the source document 140, the selection portion or snippet of the source document 140, any sources referenced within the source document 140, the publish date of the source document 140, and the link to the source document 140 that can be used by the system to retrieve the source document 140 for displaying in the browser interface.

FIGS. 2-6 illustrate examples of interactive word processing interfaces and corresponding browser interfaces, according to embodiments of the present disclosure. The interactive word processing interfaces and browser interfaces can form parts or sections of a user interface 200. The user interface 200 can have a plurality of parts or sections, each of which can have further sub-parts or sub-sections.

Figure 2:
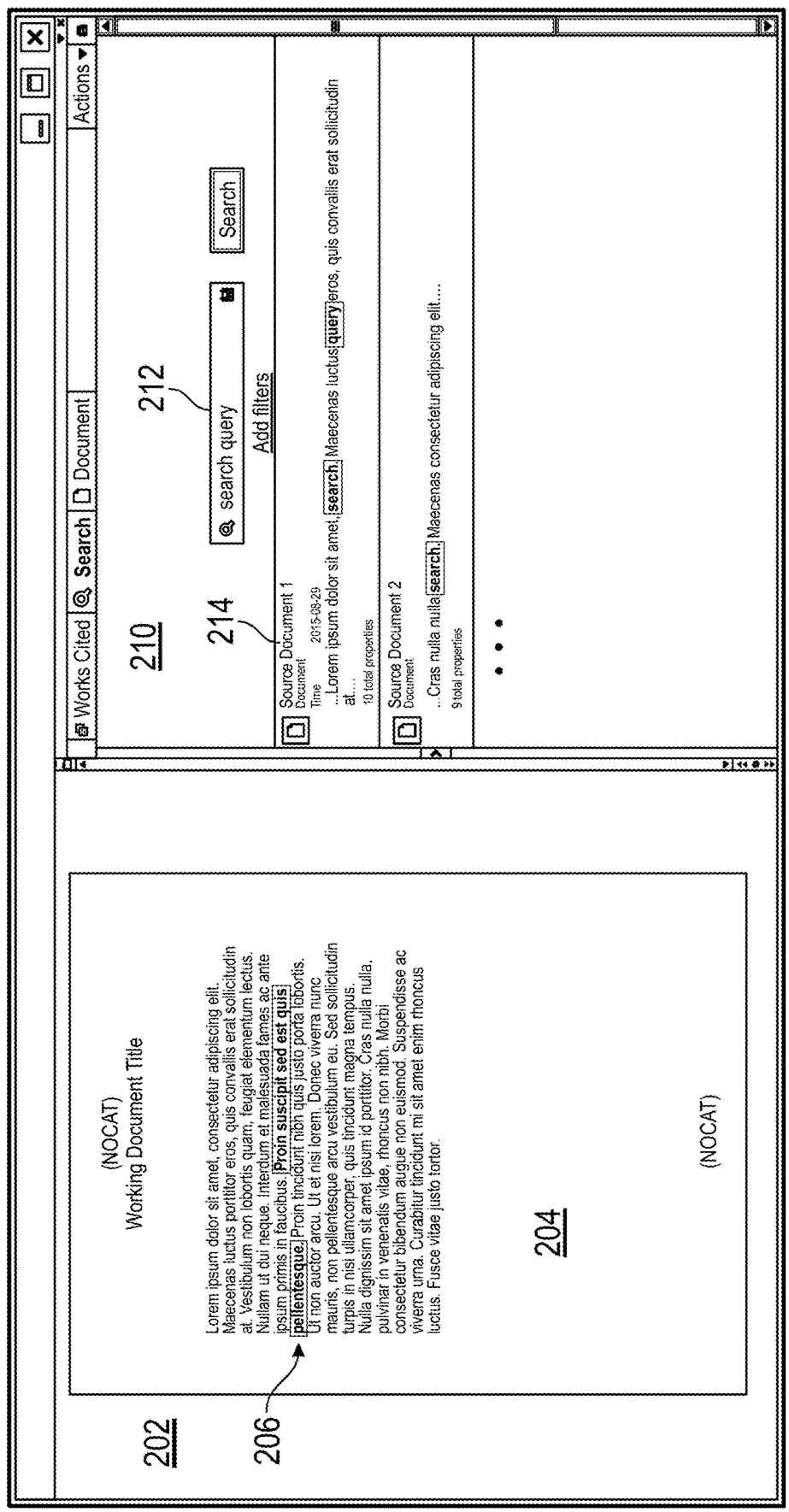

FIG. 2 illustrates an example word processing interface 202 displaying the contents of a report document 204 being edited within the word processing interface 202. A user has selected a portion 206 of the report document 204 in order to reference a source. More specifically, the user has highlighted a sentence of the report document 204 in the word processing interface 202. In practice, a user could select any portion of a report document including various objects such as text, tables, charts, graphs, images, and so forth.

Also shown is an example browser interface 210 that is configured to search for source documents that can serve as references to the report document 204. The browser interface 210 contains a search bar 212 that can be used to enter a search string for searching through a database of source documents based on the subject or contents of the source documents and/or metadata/properties associated with the source documents (e.g., author, date, etc.). In some embodiments, the search query can be automatically executed and the search can be automatically performed in response to one or more actions by the user made in the interactive word processing interface without further user interaction in the browser interface. For example, the user can highlight a portion 206 of the report document and select an option in the interactive word processing interface to search for sources relating to the highlighted portion 206. The interactive word processing interface can use one or more function calls to the browser interface to automatically perform a search for the heighted portion or a query related to the highlighted portion without user interaction. There may be various filters that can be applied to the search, such as a date filter or a property filter. The browser interface 210 also has search results 214 which may show a summary or snippet of some source documents that meet the search criteria. In the illustration, some of the parts of the found source documents that match the search string are highlighted and presented to the user. The user may be able to select a source document among the search results in order to view that source document within the browser interface 210. In some embodiments, access to the database may require a user to log in. This way, the database can determine one or more categories accessible to the user based on the log in credentials. If the user fails to supply credentials, then access to the database may be completely denied. If the user supplies credentials authorized to access certain categories, then the database can selectively search for sources authorized by the user's credentials and not permit access to sources that are not authorized. The database can track the users who log in and sign out.

In some embodiments, users may be able to use the browser interface to read through various source documents and bookmark interesting content in those source documents by selecting the content and dragging it onto some location on the interface. In some of such embodiments, interesting content can be bookmarked by dragging it into a "binder" of the browser interface, which holds snippets, graphs, maps, charts, and other objects/content from the source documents that can be used later for sources or for writing out the report document. In some of such embodiments, the binder may be further organized with labels and bookmarked content may be labeled or tagged with notes by the user. In some embodiments, the bookmarked sources in the binder may be sorted by the order of the bookmark, with document-level citations at the end of the binder. There may also be a feature to sort through the bookmarks with alphabetically or chronologically.

In some embodiments, selecting and storing interesting content may further involve the system performing a regex (regular expression) to extract the categorization associated with the selected portion of the source document. The system may further prompt the user to confirm that the categorization is correct, such as through the browser interface. The selected portion of the source document that is bookmarked may be stored along with its categorization, the categorization authority, and dates that the categorization is updated or changed. Other properties or metadata of the source document may also be collected and stored in order to provide a full citation or reference.

Figure 3:
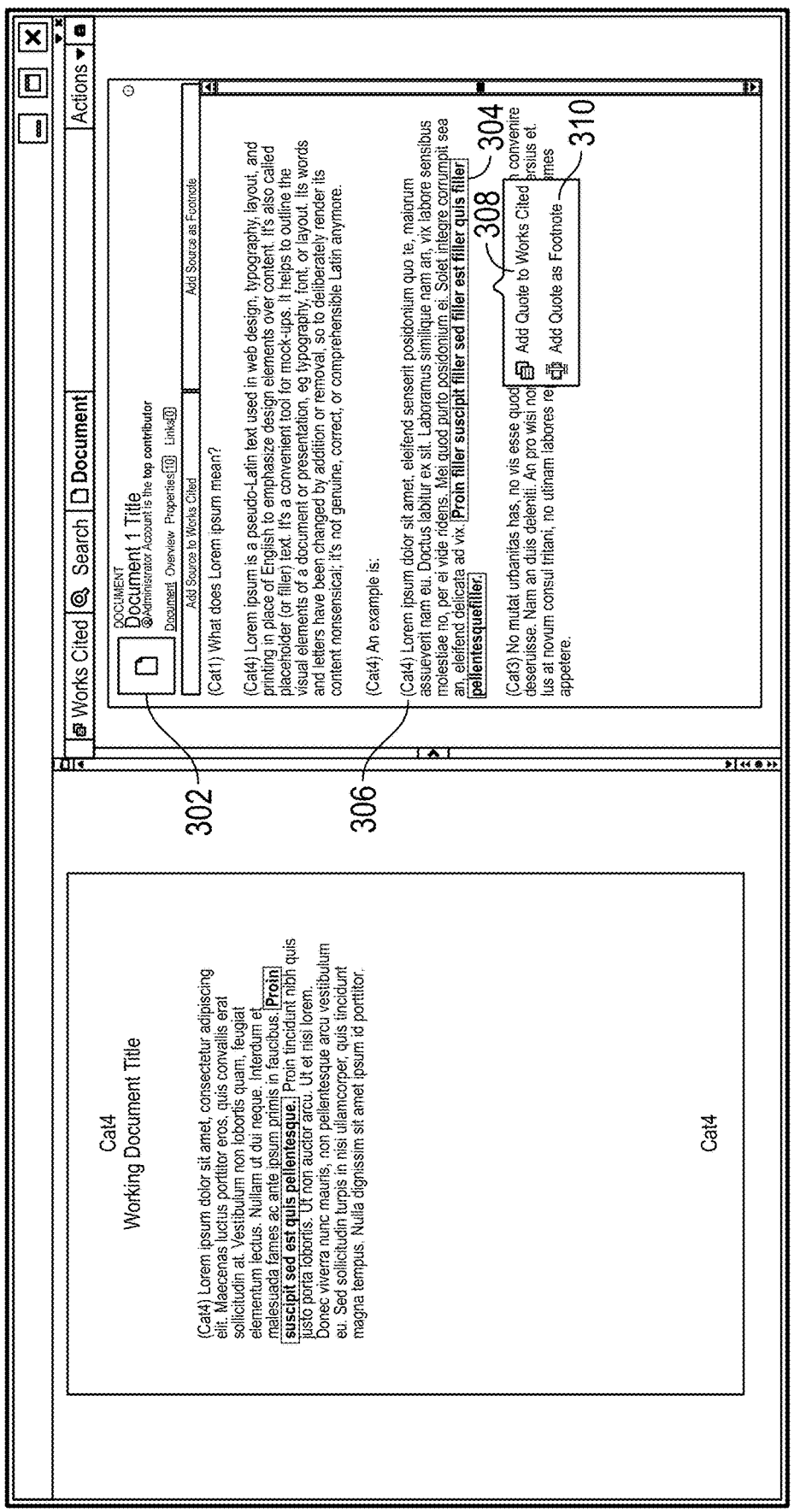

FIG. 3 illustrates an example browser interface displaying the contents of a source document 302. At the top, the title and the author of the source document 302 is shown.

The user may select a portion 304 of the source document 302, such as by highlighting that portion 304 within the browser interface. In the figure, the user has highlighted a sentence intended to serve as a reference to the selected portion of the report document, as shown in the corresponding word processing interface. Just prior to the selected portion 304 of the source document 302 is a categorization 306. In some embodiments, the source document 302 may have an overall categorization, and in some embodiments, different portions of the source document 302 may have their own categorizations. In this example, categorization 306 is applicable to the selected portion 304 of the source document 302. In some embodiments, linking to the selected portion 304 may also import and preserve the categorization 306 for the selected portion of the report document. By citing to a source document, or portion thereof, with a categorization 306, the report document category can be automatically updated to reflect the same categorization 306.

In some embodiments, selecting the portion 304 of the source document 302 may open up additional options. For example, the browser interface provides a button 308 to add the source as a citation, as well as a button 310 to add the source as a footnote. There may also be buttons to add the selected portion of the source document to the report document as a quote, such as a button to add a quote to the report document, or create a footnote citing back to that quote, and/or the like. Thus, there may be options corresponding to each of the four different types of relationships between portions of a source document and a report document, as previously mentioned.

For some embodiments, such as embodiments in which the browser interface may have a "binder", bookmarked content and portions of source documents may be dragged from the browser interface into the interactive word processing interface and dropped into whitespace (e.g., between blocks of text or portions of the report document) of to embed that content into the report document. Dragging that bookmarked content onto a portion of the report document (e.g., a block of text) may create a link and associate that content as a reference to that portion of the report document.

Figure 4:
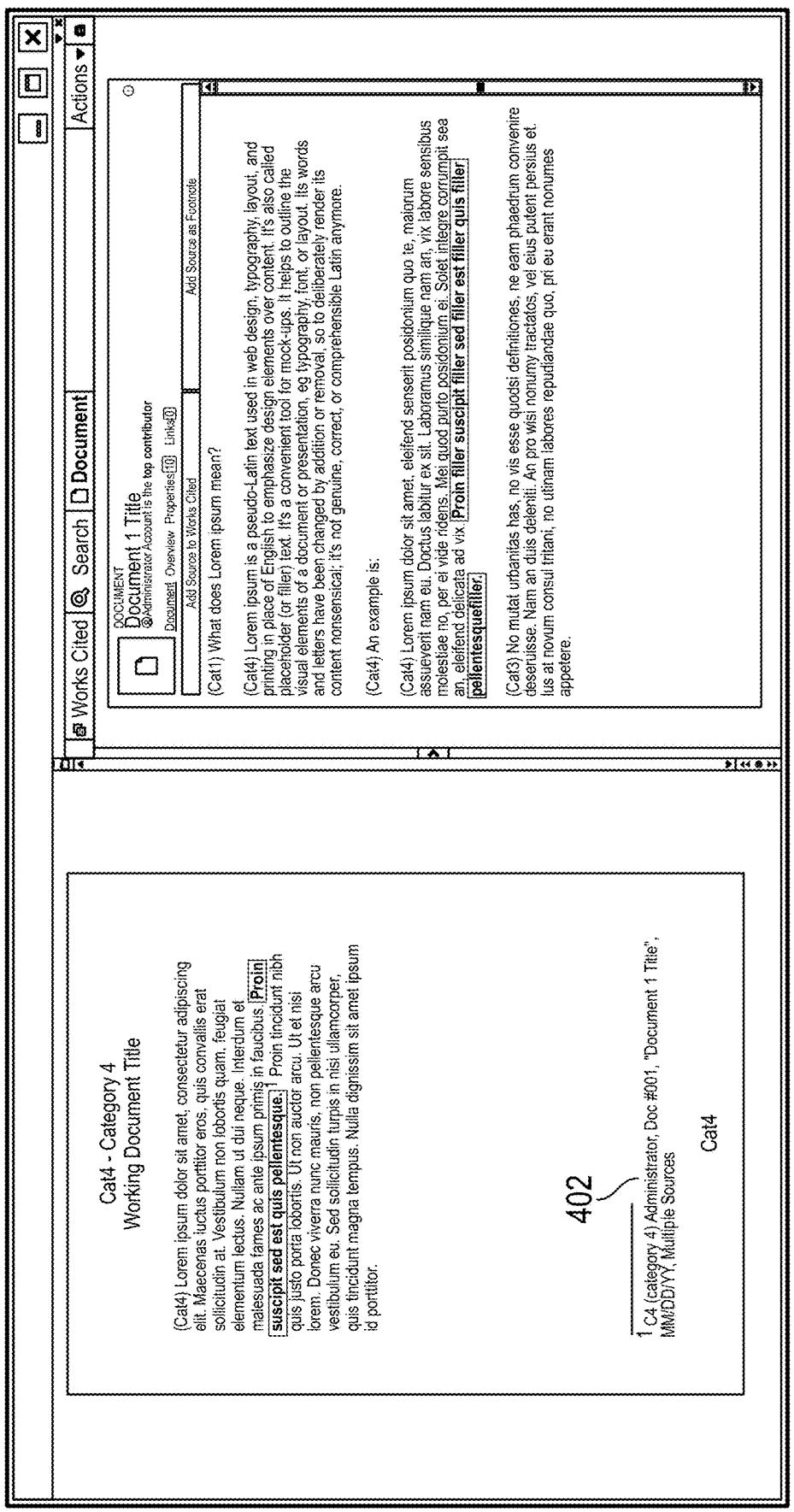

In some embodiments, the block of text in the report document for which content from the source document has been dragged onto may inherit the categorization of that portion of the source document. For example, if a portion of a source document had a "B" categorization and was linked to a paragraph in the report document, that paragraph in the report document would have the "B" categorization applied to it as well. A single portion of the report document (e.g., a single paragraph) may have many different sources linked to it. In some embodiments, a portion of the report document that has multiple sources linked to it inherits the categorization of the highest-categorized source. For example, a portion of the report document that has a "B" categorization inherited from one linked source and an "A" categorization inherited from another linked source may have an overall "A" categorization if that is the highest level of categorization for that portion of the report document. For example, as shown in FIG. 4, the report document inherits the category 4 categorization from cited passage in the source document. In another example, categorizations may be combined in some instances. For example, if a single portion of a report document includes linked sources that indicate, respectively, category A1 and category A2, that single portion of the document may be given a combined category of A1-A2. Other types of combining of categorizations may also be applied.

In some implementations, the categorization is accomplished through analysis of document portions using regular expressions (e.g., an existing categorization for a portion of the report document may be determined by a regular expression that parses out the existing categorization form the text of the report document).

Figure 5A:
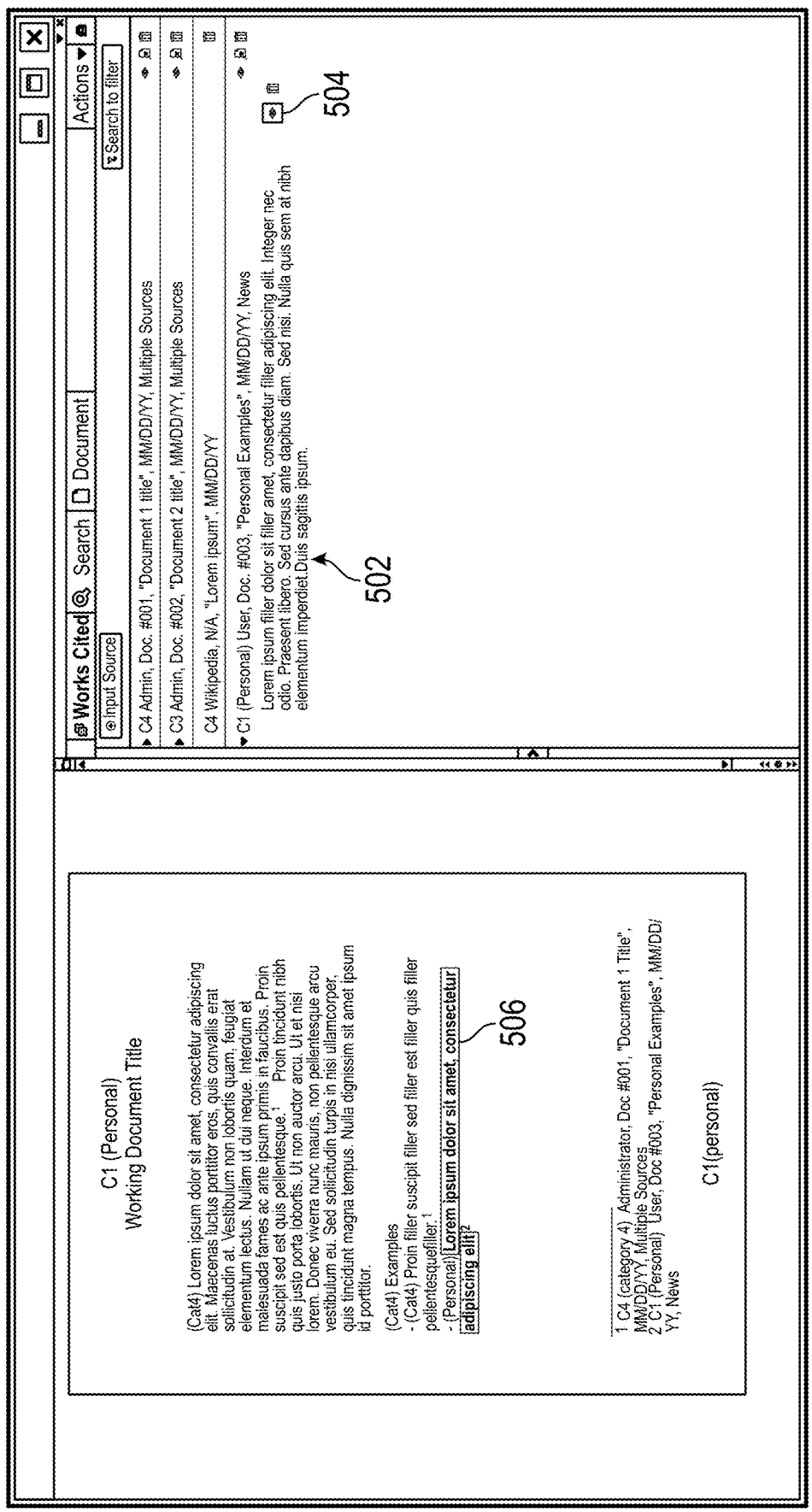

In some embodiments, the overall categorization of the report document may inherit the highest categorization (or a combination of categorizations, as described above) associated with any of the portions of the report document. For example, if the report document had paragraphs of varying categorizations and one of the paragraphs had an "A" categorization that represented the highest level of categorization among all the paragraphs in the document, then the report document's overall categorization would be set at "A". For example, as shown in FIG. 5A, a passage 506 causes a paragraph categorization to reflect the highest categorization level of categorization 1—personal.

In various embodiments, before a categorization is applied to a portion of a report document (or the overall report document), the user may be prompted to confirm or edit the categorization. Such a prompt may be provided via any of the user interfaces described herein, and may be provided before categorizations are inherited/combined, or after. For example, the system may determine a categorization of a source document, and may then prompt the user to confirm the categorization before proceeding with inheritance/combining with other categorizations of the portion of the document associated with the source.

FIG. 4 illustrates a footnote 402 that has been added to the word processing interface. The footnote 402 may have been added by selecting button 310 to add the selected portion of the source document as a footnote. The footnote 402 is tied to the selected portion of the report document and references the selected portion of the source document. The footnote 402 can be formatted according to a user-selected citation format. Once added, the footnote 402 and associated categorization can be edited by a user in the word processing interface as normal text.

In some embodiments, a citation to a source can be added to a list of works cited, a bibliography, table of citations, etc. The works cited can be on a different page (e.g., at the end). The citation to the works cited can be automatically generated in response to a user interaction in the browser interface without further interaction from the user in the word processing interface. In some embodiments, in response to a user interaction in the word processing interface, a works cited can be generated by parsing the report document to find all the citations (e.g., by parsing for the unique identifiers) and generating a list of sources in the works cited (e.g., based on the citations in the document, based on the bibliographic data fields associated with the unique identifier).

FIG. 5A illustrates a word processing interface and a corresponding browser interface displaying all the referenced sources associated with the report document. For example, the system may be configured to go through the report document to identify all the embedded links or unique identifiers, look up the data entries associated with all of those unique identifiers, retrieve all the corresponding source documents, and display the referenced portions of the various source documents in the browser interface. In some embodiments, the browser interface may be configured to display, for the report document, a list of all referenced source documents and their categorizations. There may also be options for viewing the exact portions of the source documents that are being referenced.

For example, in the figure the browser interface shows a list of three sources referenced in the report document, and buttons are available next to each listing that allow the specific linked portion of those source documents to be displayed. In particular, the referenced portion 502 of the third source document is displayed. A button 504 can be selected to highlight the corresponding portion 506 of the report document that is linked to the portion 502 of the third source document. In some embodiments, hovering over the displayed portion 502 of the third source document may automatically highlight the corresponding linked portion 506 of the report document. In some embodiments, the button 504 may be an "eye" button. Clicking the eye button may expand the source listing and show the referenced portion or quote of the source document, while also highlighting the associated portion in the report document to demonstrate the relationship. A single source may be referenced multiple times within a report document.

Within the source listing displayed on the browser interface, there may also be a feature to filter through all the referenced sources. For example, there may be a drop-down menu that enables a filter to be applied to the various sources based on categorization, the originator of the source document, date published, collection type, contributing authors, user-applied labels or tags, and so forth. In some implementations, the system may generate a histogram which aggregates across all sources associated with the report document and enables the user to filter based on various attributes of the sources.

There may also be various ways to delete one or more of the referenced sources, at least one of which is through the source listing. For example, there may be a trash icon next to each source in the source listing that, when clicked, deletes the corresponding source and its link to the report document. Other ways to delete one or more of the referenced sources and their link to the report document may include deleting the associated portion of the report document in the word processing interface, or deleting the footnote in the word processing interface if the source was linked as a footnote.

Figure 5B:
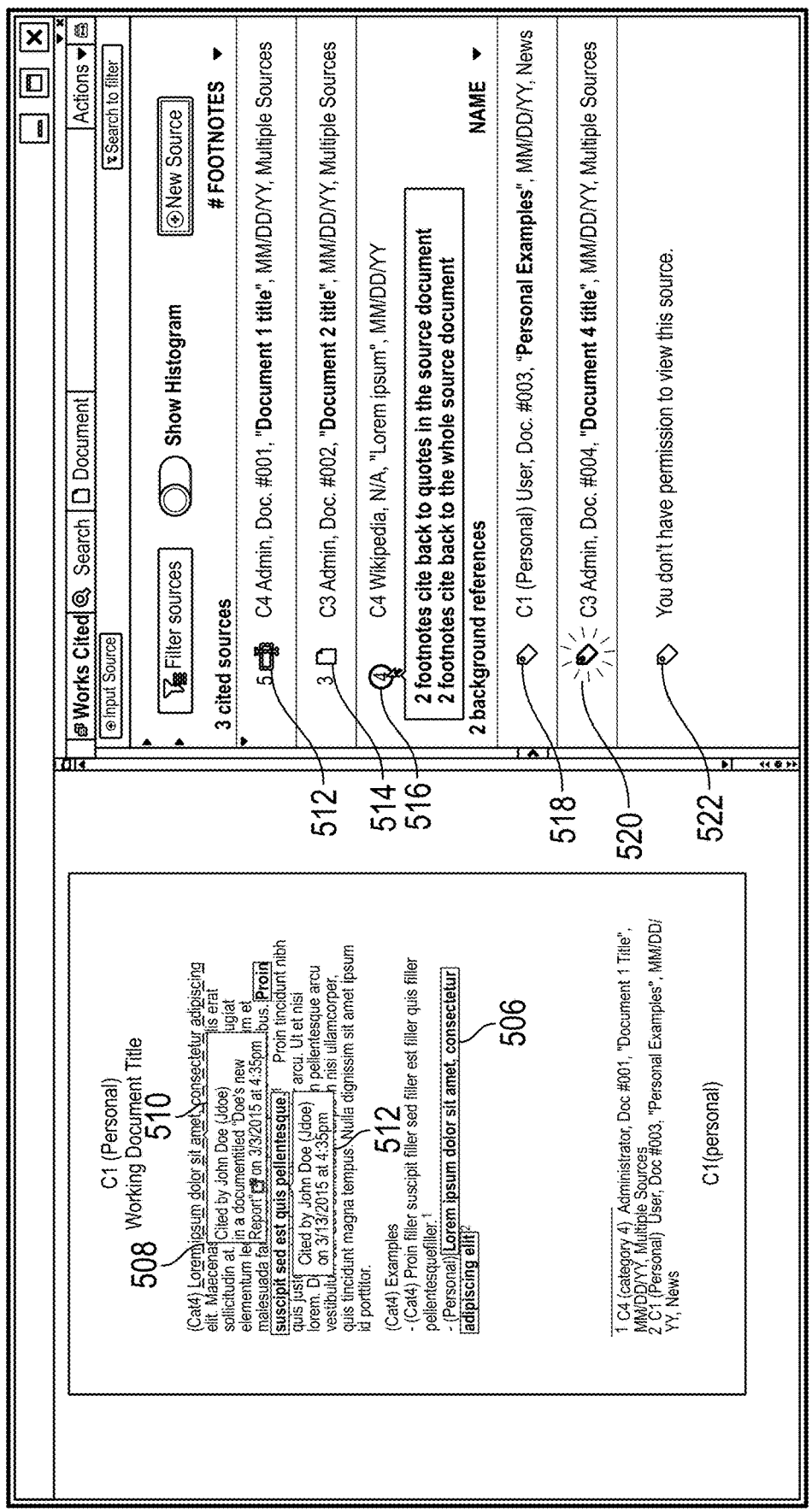

FIG. 5B illustrates another example of a word processing interface and a corresponding browser interface displaying all the referenced sources associated with the report document. The word processing interface includes a suggested tag 508 with hover box 510. The word processing interface also shows hover box 512 for a tag. The browser interface includes another embodiment of a works cited page.

A user can move a cursor or other user input device to hover over a tagged portion (e.g., the portion 206 previously tagged as shown in FIG. 2) of the report document. In response, hover box 512 can appear and display information about the tag, such as the name or username of a person who added the tag, or when the tag was added.

The word processing interface can indicate (such as with highlighting, coloring, underlining, stylizing, dotted lining or other visual indicia) a suggested tag 508. A tag can be suggested if the same or similar words appear in other source documents or have been tagged in other report documents. In the example shown in FIG. 5B, the suggested tag 508 is indicated with a dashed underline. A user can move a cursor or other user input device to hover over the suggested tag 508. In response, a hover box 510 can appear and display information. If the same or similar text has been cited in other documents, then the information can indicate who cited the same or similar text, what document the same or similar text was cited in, and when the same or similar text was cited. In some embodiments, the information can additionally or alternatively include the citation that was added for the same or similar text. The hover box 510 can also include one or more links to open either the other report document where the same or similar text was cited, the source document including the same or similar text, or both.

The browser interface shows an example works cited page. The works cited page can list linked sources and background references associated with the report document shown in the word processing interface. For example, the reference "Document 1 title" is linked with a tagged portion of the report document and is listed in the works cited page. In the example shown in FIG. 5B, other linked sources (e.g., sources associated with other pages of the report document) are also listed. Some linked sources, such as 522, may not be shown if a current user has insufficient permission to access the linked source.

In the works cited, different icons can indicate a type of link. A first icon 512 can indicate that a portion of (such as a quote from) a report document is linked to a portion of a source document. A second icon 514 can indicate that a portion of a report document is linked to a source document generally (e.g., the whole source document without indicating a specific portion of the source document). A third icon can 518 can indicate that a general report document (e.g., the whole report document without indicating a specific portion of the report document) is linked to a source document generally (e.g., the whole source document without indicating a specific portion of the source document). A fourth icon 516 can indicate a mixture of different types of links. Additional visual indicators 520 such as flashing, bolding, or other stylizations can indicate a link that was recently added to the works cited.

FIG. 5C shows another view of a works cited list and how the works cited list can be interacted with. A linked source document can be listed in the works cited as shown by 528.

The list of linked source documents can be edited. A user can click on a button 530 to edit the listing in the works cited. In response to the user interaction with the button 530, a cursor 532 can be positioned to allow the user to make edits to the listing.

The linked source documents that are listed in the works cited can be clicked and dragged. In response, a folder directory menu 534 can appear. A folder can be selected, and the linked source document can be dragged into the selected folder to save a copy of or shortcut to the linked source document.

A button 536 can be interacted with to cause a listing to expand and show excerpts of a source document. The excerpts can be displayed in the order that they occur in the source document or in the order that they occur in the report document. Any of the excerpts can be clicked on. In response, the browser interface can show where in a source document that the excerpt is linked from, or the word processing interface can show where the excerpt occurs in the report document. A selection can be indicated with a visualization 538.

The works cited page can separately list background references. Background references can include sources documents that are linked to a report document but are not linked to any particular portions of a report document (e.g., not linked to any selected portion 206 as shown in FIG. 2).

Figure 6:
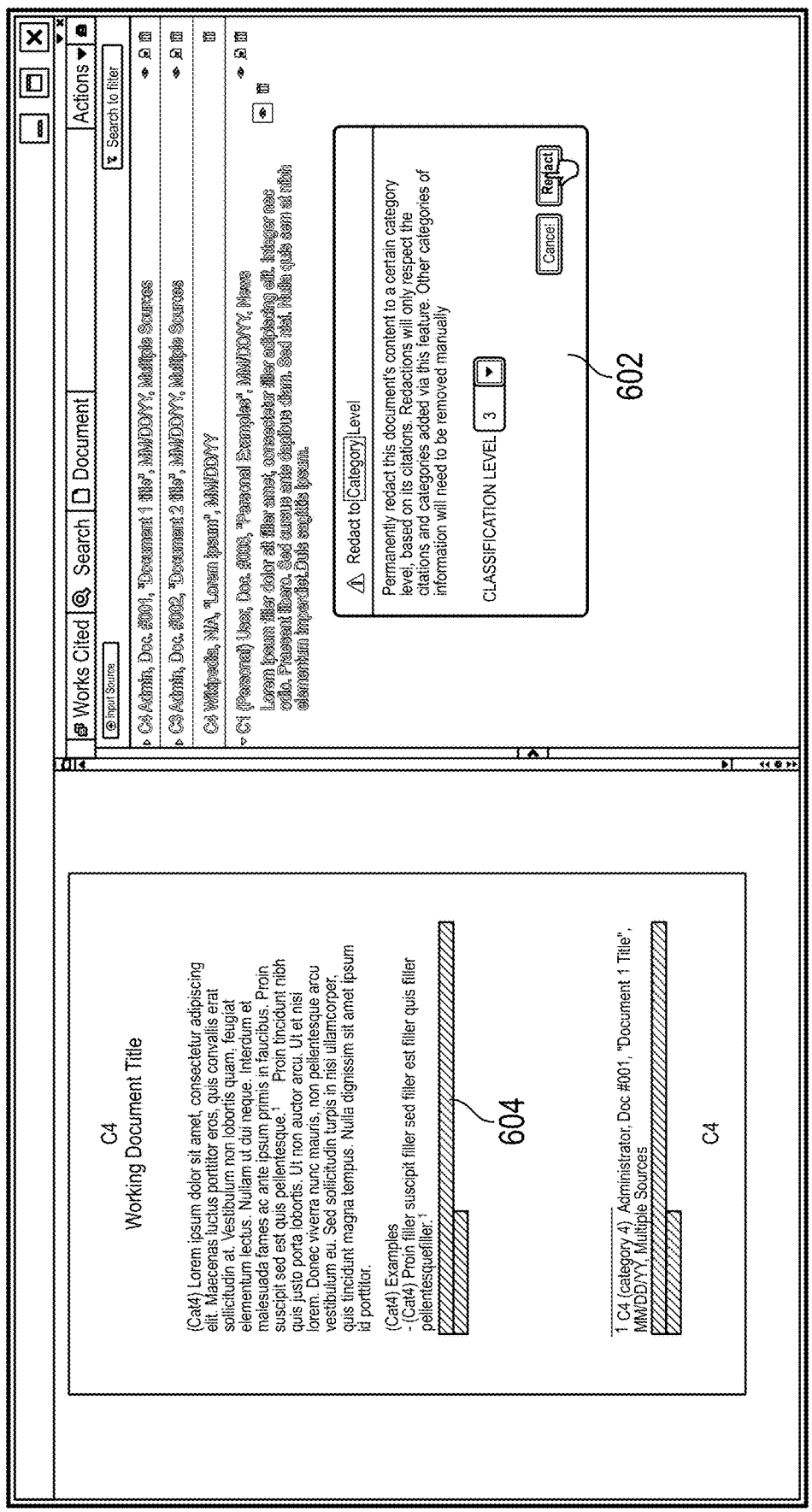

FIG. 6 illustrates a feature provided in the browser interface through which a user may be able to filter the document-level categorization to determine what the report document would like if released at a lower categorization. For example, a report document may have a paragraph that has a higher categorization than the rest of the paragraphs. The report document may be released at a lower categorization level that excludes the higher-categorized paragraph from showing up, which means content from the report document will be missing. The system may have a preview feature that allows a user to view how that report document would look if released at various categorization levels, in order to ensure that the report document transitions and flows smoothly despite certain content being excluded.

In the illustration shown, the system may filter and present only the text in the report document that is of a certain categorization level, with the categorization level chosen through a drop-down menu via a pop-up 602. Upon selecting the desired categorization level and clicking "redact", the filtered version of the report document is presented through the interactive word processing interface. The redaction can cause data in the report document to permanently deleted or replaced with an obstruction such as blackout 604 if the data falls outside of the desired categorization level.

A report document can be saved and opened by a second user. The second user can, via the browser interface, input credentials to access the identifier database. The system can then find sources for the second user or make further edits to the source document. The second user can, in the interactive word processing interface, click on the quoted passages or cited sources created by the original author. If the second user if the second user is authorized, the system can then automatically retrieve the sources in the browser window without requiring further manual interaction from the second user in the browser window.

A report document can be saved to a workspace in the database. Documents in the workspace can be accessed by other users who are authorized to access the workspace. Reports in the workspace can be linked together through citations. For example, a first report can cite to a second report, which may cite to a source in a workspace. The system can automatically link the first report to the source, or provide the source for viewing when a user clicks on the citation in the first report. Similarly, sources of sources within a workspace can be linked. This way, a network of citations can be constructed within the workspace, enabling additional features, such as finding the most commonly cited sources or authors.

Tagging Embodiments

Once a first report has been generated by an author, the first report can be reviewed by a project analyst or tagging specialist who is familiar with the larger picture surrounding the report. Tags may be data structures that include a label or description. Tags can be applied to one or more parts of a report document fitting the label or description. Different types of tags include tag objects, tag properties, tag links, etc. The project analyst may recognize connections between the current report and information in a second report falling within the larger picture. For instance, this can include recognizing people, places, etc. that are mentioned in both reports. However, only the analyst who has read both the first report and the second report will know about the connections. Other people who have not read both the first report and the second report will not have such knowledge. By the same logic, the analyst or specialist may not have read a third report that includes other connections.

Accordingly, one way to document connections is to make a record of the people, places, times, facts, and other data objects in multiple reports. Many people and automated systems can contribute their knowledge to a database as a repository about connections between different people, places, times, facts, and other data objects mentioned in different reports such that a collective knowledge base is created. However, in some instances, such a solution can be ineffective because ambiguous terms can be misidentified and important parts might be overlooked. Additionally, the project analyst or tagging specialist might misinterpret the underlying report or lack insight into certain facts behind the report. Accordingly, the author of a first report may be in the best position to know which sections, words, or phrases in the first report are matched with, connected to, or otherwise related to facts in other reports. However, the author of the first report may not have read all of the other reports.

Accordingly, an interface is presented to efficiently enable the author of a report to "tag" words or sections of a report that match words or sections of other reports, even though the author may have never read the other reports. This can enable the author, who is familiar with the authored report, to perform disambiguation while the information is fresh, rather than having a different person do so after information in the report has become stale. This can also enable information in the author's report to be linked to any type of data objects in other reports that are further linked to further data objects in further reports and so on. Additionally, some of the embodiments can allow users (such as authors) to tag documents faster. Many interface elements are designed and organized to improve usability and convenience so that the development and tagging of report documents is performed faster. The interface elements can also be designed and organized to provide a unified interface for authors to tag documents while writing—at the time that the information is freshest in the author's mind. In contrast, separate tools that are used for later tagging lose many benefits. Authors are less motivated and less likely to tag as time progresses, and the author's memory becomes stale. Tagging documents can enable better searches that automatically disambiguate search terms. In addition, different types of tags can provide structure to information, link different data and different reports, and provide context and structure to a report document. Such context and structure can enable computer-based ontological analysis that would otherwise not be possible. For example, computers can automatically implement an ontology system that can analyze a document or portions of a document and return results based on relationships identified in links between different data objects (e.g., two data objects are tagged in a document, therefore they may be associated with one another).

Figure 8:
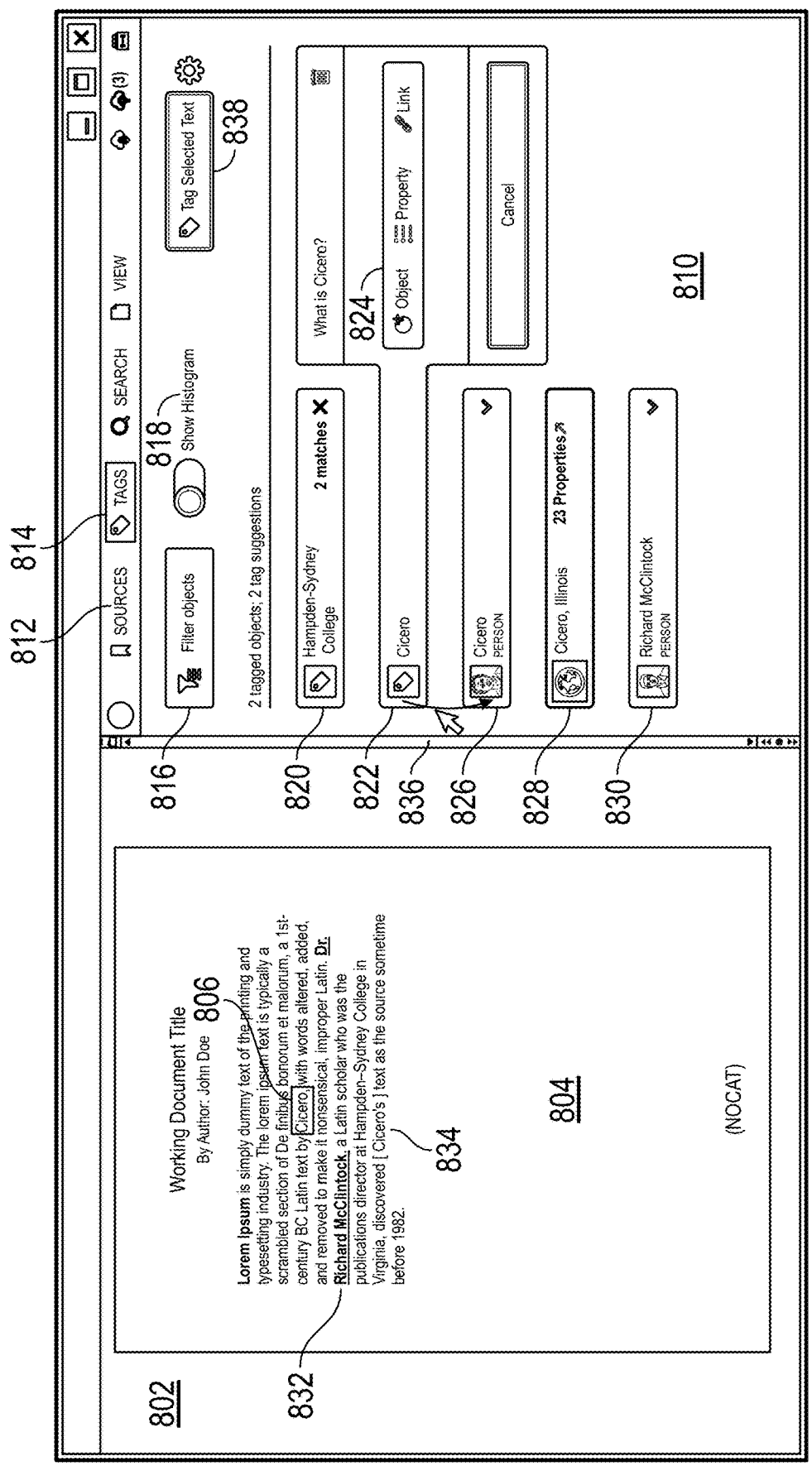

FIG. 8 illustrates an example of an interactive word processing interface and a corresponding browser interface, according to an embodiment of the present disclosure. The example word processing interface 802 displays the contents of a report document 804 being edited within the word processing interface 802. A user has selected a portion 806 of the report document 804 and the clicked the "Tag Selected Text" button 838 in order to tag the selected portion. More specifically, the user has highlighted the name "Cicero" in the report document 804 in the word processing interface 802. In practice, a user could select any portion of a report document including various objects such as letters, words, sections, text, tables, charts, graphs, images, and so forth that can be people, places, verbs, communications, relationships, and so forth.

Also shown is an example browser interface 810 that is configured to display tag information related to tagged portions of document 804. The browser interface 810 contains a "sources" tab 812, a "tags" tab 814, a filter objects button 816, a show histogram button 818, tags 820, 822, 826, 828, and 830, and tag options 824.

The sources tab 812 can be clicked to change the browser interface 810 to display source information, such as shown in FIG. 1-6. The "tags" tab can be clicked to change the browser interface from the browser interface for sources (such as 210 in FIG. 2) back to the browser interface 810 for tags.

The filter objects button 816 can cause the list of tags to be filtered such that tags satisfying certain criteria are shown. This can include filters for tags by text, by tag type, etc.

The show histogram button 818 causes the browser interface to show a histogram of tagged objects, further discussed below with respect to FIG. 11B.

The browser interface 810 can also show tags that correspond to words or parts of the report document 804. The tags can be stored in a database. In some embodiments, the identifier database and the database for tags can be the same physical database. In some embodiments, the identifier database and the database for tags can be different physical databases.

In some embodiments, each tag and the corresponding words or part of an identified report document can be stored in a database so that a search in the database can identify all reports, including the words or parts of those reports that are associated with the tag. The database can also store additional information (e.g., properties, linked tags, linking relationships, etc.) about the object underlying the tag.

In some embodiments, the database stores an object identifier that is associated with the tagged text. The object identifier can match hidden text in a report document, where the hidden text indicates which portions of the report document are associated with the tag. The database can include a data structure listing which tags are referenced in which report documents, and the report documents can be accessed to retrieve the details of each tag. Each report document can include, as a variable or other hidden text, a unique document ID. The reference ID's can be used by the database to identify report documents.

In some embodiments, reports (including tags embedded in the reports) can be stored as document objects in a database. The database can search for the tags in the document objects. The database can also keep separate tag data apart from the document objects.

A tag 830 for the person Richard McClintock is associated with the text "Dr. Richard McClintock" 832 in the report document 804. The words "Dr. Richard McClintock" 832 are stylistically differentiated in the report document 804 (e.g., by underlining, italicizing, changing the font or font size, adding dotted lines) so as to indicate that those words are tagged. The style can be individually customized for each tagged section of the report document. Clicking, hovering over, or otherwise interacting with the tagged section 832 can automatically cause the browser interface 810 to display information from the database associated with the tag, including other documents containing the same tag, the sections of other documents containing the same tag, properties of the tag, information linked to the tag, other information in the database related to the tag, and/or other information extracted from the text of other tagged documents. Clicking, hovering over, or otherwise interacting with the tag 830 in the browser interface can cause the report document to bring the associated text 832 to the user's attention, such as by scrolling to the section of the report document containing the associated text 832 and visually distinguishing the associated text 832.

The word "Cicero's" 834 in the report document 804 is tagged with tag 826 for the person Cicero. The report document 804 can embed the tag information as invisible data around the word "Cicero's." Invisible data can include any data in a document that is not normally printed or visible when viewing the document in a WYSIWYG editor. Examples include metadata, hidden text, invisible text, formatting data, bookmark data, etc. The embedded tag information can include a database object identifier. In the example embodiment shown in FIG. 8, the bracket symbols surrounding the word "Cicero's" are visual indications the surrounding area that contain hidden data causing the word "Cicero's" to be associated with the Cicero tag; the bracket symbols are not actually a displayed part of the report document 804. The tag 826 includes a picture of Cicero. This picture can be a property of the tag, and it can be retrieved from the database or from a different report document that has a picture tagged as Cicero. In response to a cursor being positioned in the space included within the brackets, the corresponding tag in 830 in the browser interface 810 can be highlighted or otherwise visually indicated.

The browser interface 810 can automatically suggest some tags. This can happen automatically as an author writes a report document. It can also be triggered by other events, such as opening a document, saving a document, or clicking the "Tag Selected Text" button 838, importing data, etc. A regex search can be performed to suggest tags for words that match certain text patterns. For example, a regex combination of numbers such as "(###) ##-###" can be used to search for phone numbers. As another example, a regex search can be used to check names by searching for capitalized words that do not start sentences and/or are not in dictionaries. Other regex searches can be defined for addresses, social security numbers, coordinates, etc. In some embodiments, a tag can be suggested based on the regex match. In some embodiments, tags can be suggested by searching the database for tags that match or are very similar to words in the report document. In some embodiments, both the regex and database searching techniques are used. In the example shown in FIG. 8, the words "Hampden-Sydney College" in the report document 804 was recognized and matches or is similar to two tags in a database. Accordingly, tag 820 is suggested. The author can click on the suggested tag 820, which will cause the browser interface to display data about the two suggested tags. The author can then disambiguate which of the two tags already in the database is correct.

The browser interface 810 also suggests another tag 828, the location Cicero, Ill. This can be automatically suggested for the occurrence of word "Cicero" 806 in the report document 804. The tag 828 is a specific location named Cicero, but the tag 828 does not match the Cicero referenced by the author. The author can reject or delete the suggested tag 828, or click the dropdown arrow in the tag to see alternative suggestions.

As an alternative to selecting existing tags, a new tag 822 can be created for selected text 806. Making a selection (e.g., highlighting) in the report interface can cause the browser interface to automatically suggest an existing tag with the same letters and/or can cause the browser interface to suggest creating a new tag 822 with the same letters. A menu 824 is displayed to provide context for and information about the new tag 822. The tag 822 and/or the menu 824 can be automatically displayed in response to clicking on the "Tag Selected Text" button 838. The menu 824 allows the author to select a name or label for the tag. The menu 824 allows the author to select a type of tag for the new tag: an object, a property, or a link. Examples of objects include people, physical things, etc. Examples of properties include facts or descriptions of objects such as the height of a person, the cost of a physical thing, etc. Examples of links include relationships or objects between objects such as a social relationship between two people as friends, family, etc. Further details about creating a new tag are discussed with respect to FIG. 9.

As an alternative to manually defining a tag, the user can use a cursor to drag and drop 836 the new tag 822 onto an existing tag 826. This can cause the new tag 822 to automatically fill out information by copying the information from the existing tag 826 so that the author does not need to re-enter the information.

In some embodiments, the drag-and-drop action can be contextual. For example, where the names are similar or the same, the new tag can copy data from an existing tag of the same name. However, if an existing tag is dragged and dropped onto a different existing tag that is of a different type or has a different name, then a link between the two tags can be created, or one property tag can be set as a property of an object tag.

Figure 9:
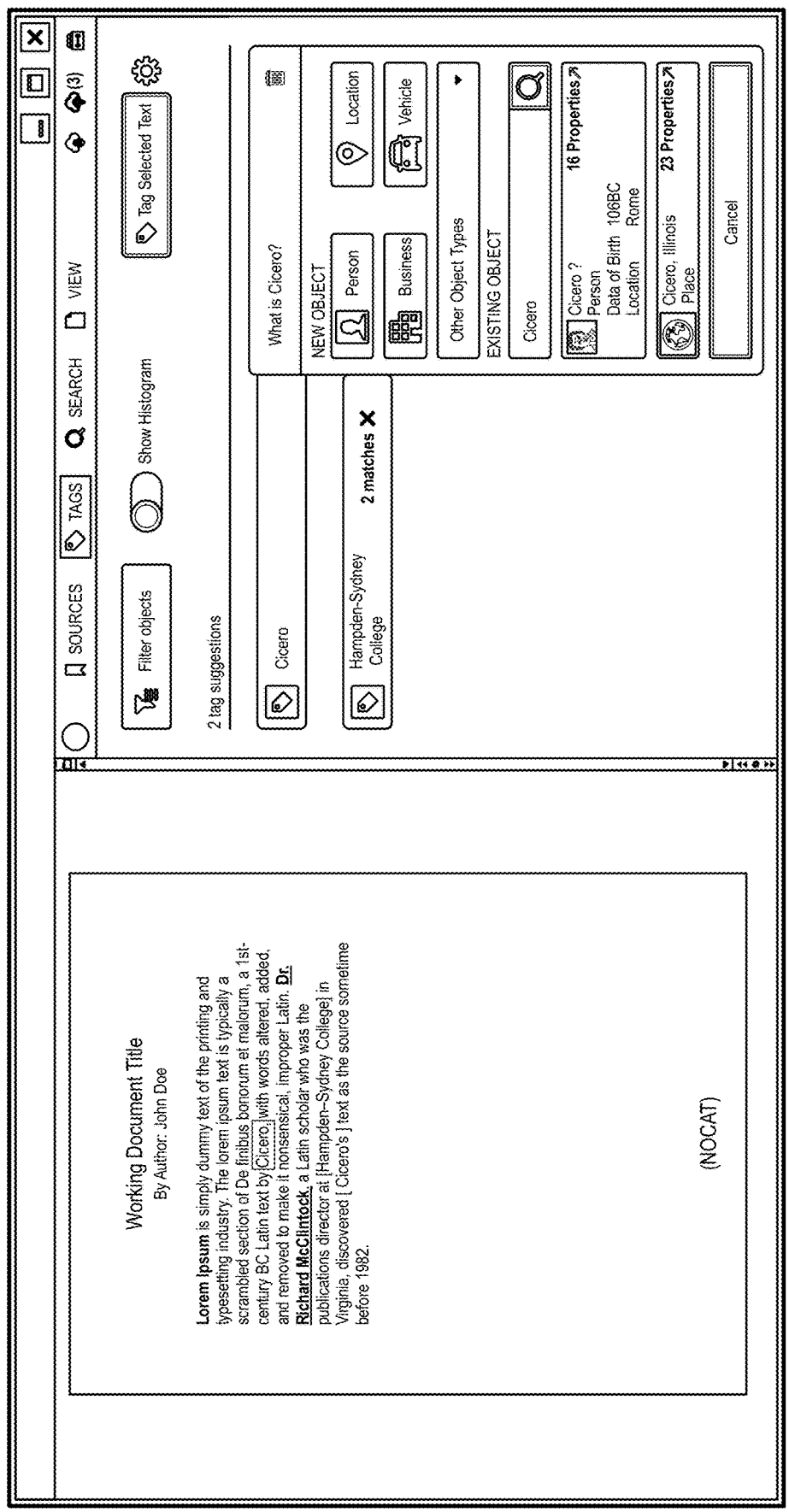

FIG. 9 illustrates an example of an interactive word processing interface and corresponding browser interface according to an embodiment of the present disclosure. In FIG. 9, details are shown for creating new tag 822. A user (such as an author or reader) has selected a portion 806 of the report document to associate with a new tag 822.

A menu 902 is displayed so that the user can provide details about the new tag 822. The menu 902 can be different depending on which type of tag is being created (e.g., objects, links, or properties). The example menu 902 is shown for object tags. The menu 902 displays icons to allow the user to select the type of object 904, such as a person, location, business, or vehicle. A drop down menu 906 can allow the user to select other types of objects. A search bar 908 allows the user to perform a search for existing object tags. The search bar can be automatically populated by the selected text 806 and a database can automatically perform the search when a new tag is being created. The search results can display tags 910, 912 that match the search terms.

The displayed tags, such as 910, can include information such as properties associated with the tag. In the illustrated example, a first property of Cicero, his birth in 106BC, is displayed. Another property of Cicero, his location in Rome, is also displayed. Linked information can also be displayed. For example, Cicero's picture is tagged in a second report and linked as being a picture of Cicero. The picture can be retrieved from the database or the second report document displayed on the browser interface. Likewise, properties can be defined by tags in the current report document, in a database, or in a different report document. By querying the database to find all properties of Cicero, the properties and linked information can be gathered and displayed.

Figure 10:
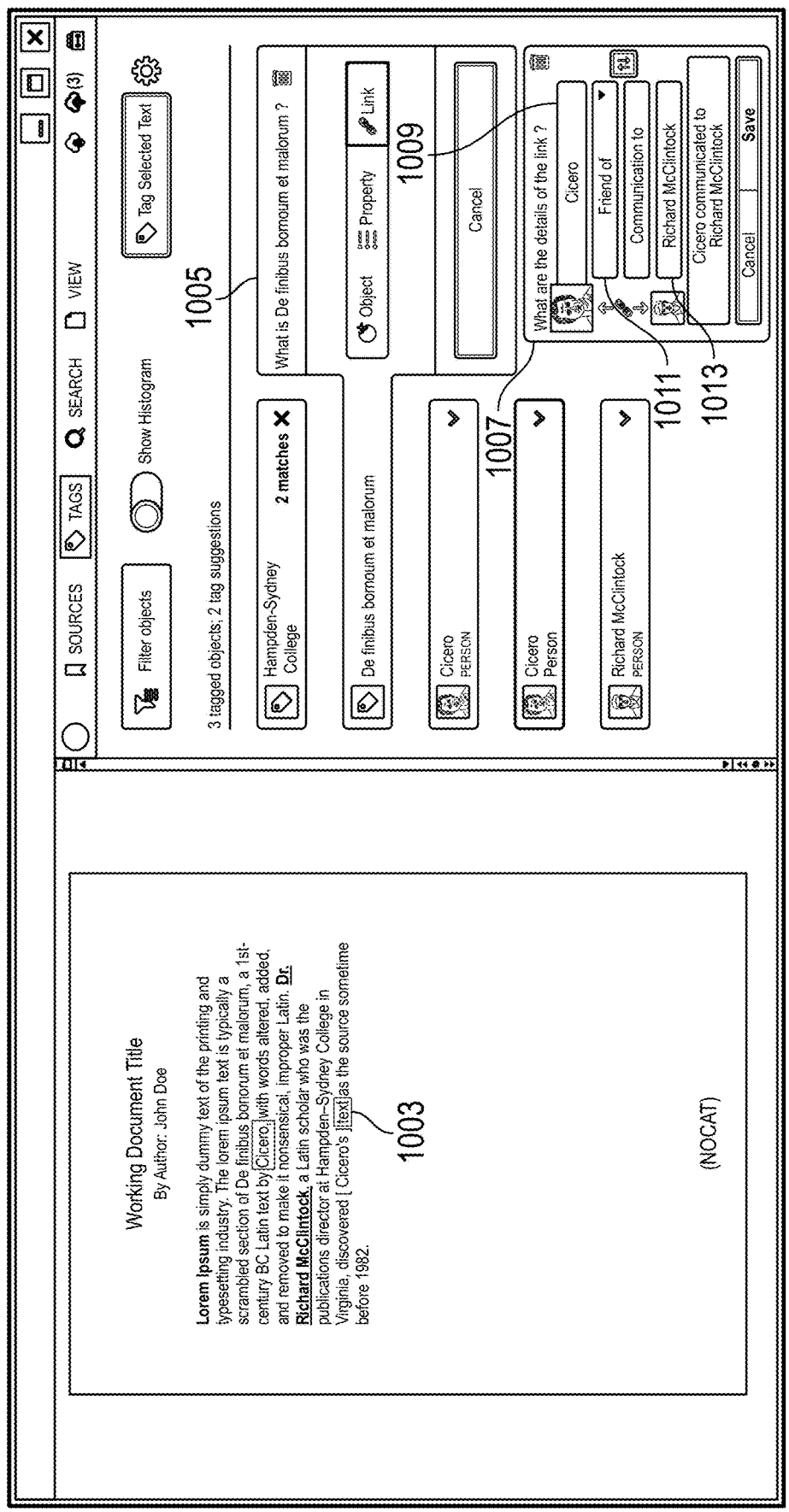

FIG. 10 illustrates an example of an interactive word processing interface and corresponding browser interface according to an embodiment of the present disclosure. In FIG. 10, a new link tag 1001 is being created. A user has selected a portion 1003 of the report document to associate with the new link tag 1001.

The user can edit the tag 1001 to have a different name ("De finibus bonorum et malorum") from the selected portion 1003, which reads "text." Users, and especially authors, can provide insights into the information underlying the words of the report, such as in the example in FIG. 10 when the word "text" refers to a specific literary work.

A menu 1005 allows the user to select which type of tag should be created, and the link type is selected. A second menu 1007 specific for link tags is displayed to allow the user to provide details about the link tag. This can include selecting a first object 1009 to link to a second object 1013 and selecting the type of link 1011. The first object 1009 and second object 1013 can be automatically suggested from the context and from existing tags, or the user can perform a search or select alternative options.

In the example of FIG. 10, Cicero's text was read by Dr. Richard McClintock, so the "communication" link is selected. Accordingly, the link tag is created such that the "text" 1003 is tagged as a communication linking Cicero and Dr. Richard.

Figure 11A:
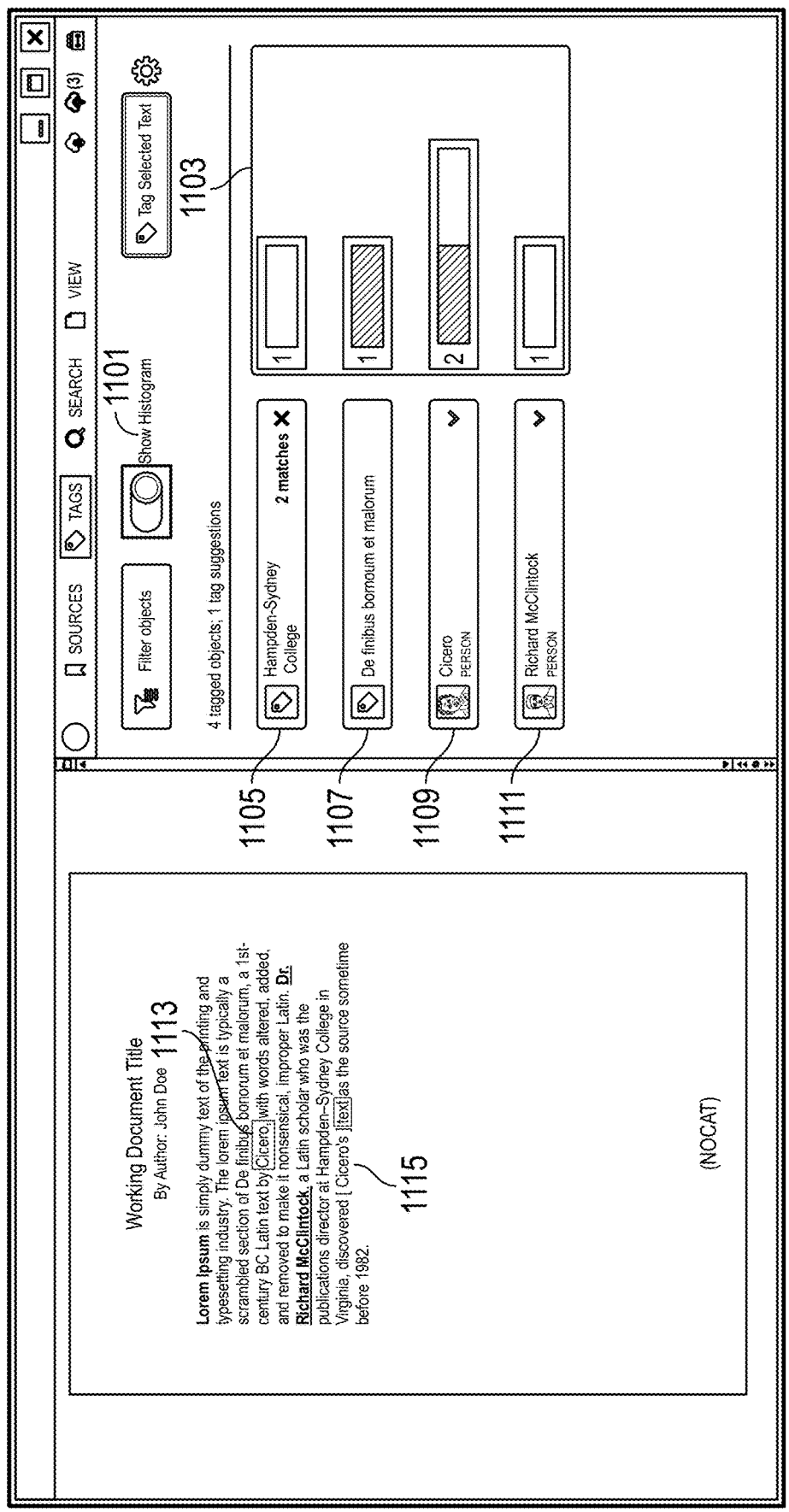

FIG. 11A illustrates an example of an interactive word processing interface and corresponding browser interface according to an embodiment of the present disclosure. In FIG. 11A, a list of the tags in the report document is displayed, and a histogram 1103 of the frequency that the tags occur is also displayed. A user has selected a histogram button 1101, causing the histogram 1103 to be displayed.

The histogram generates a visualization of the frequency of tagged objects. For example, the suggested tag 1105 "Hampden-Sydney College" is suggested for one portion of the report document. The tag 1107 is related to one portion of the report document (the word "text"). The tag 1109 is related to two potions 1113, 1115 of the report document. The tag 1111 is related to one portion of the report document. In an implementation, a histogram visualization (e.g., as shown in FIG. 11B) may be generated based on all properties of tagged objects.

In some embodiments, instead of or in addition to a histogram, the frequency information can be displayed as a graph, pie chart, N-graph, timelines, etc.

Figure 11B:
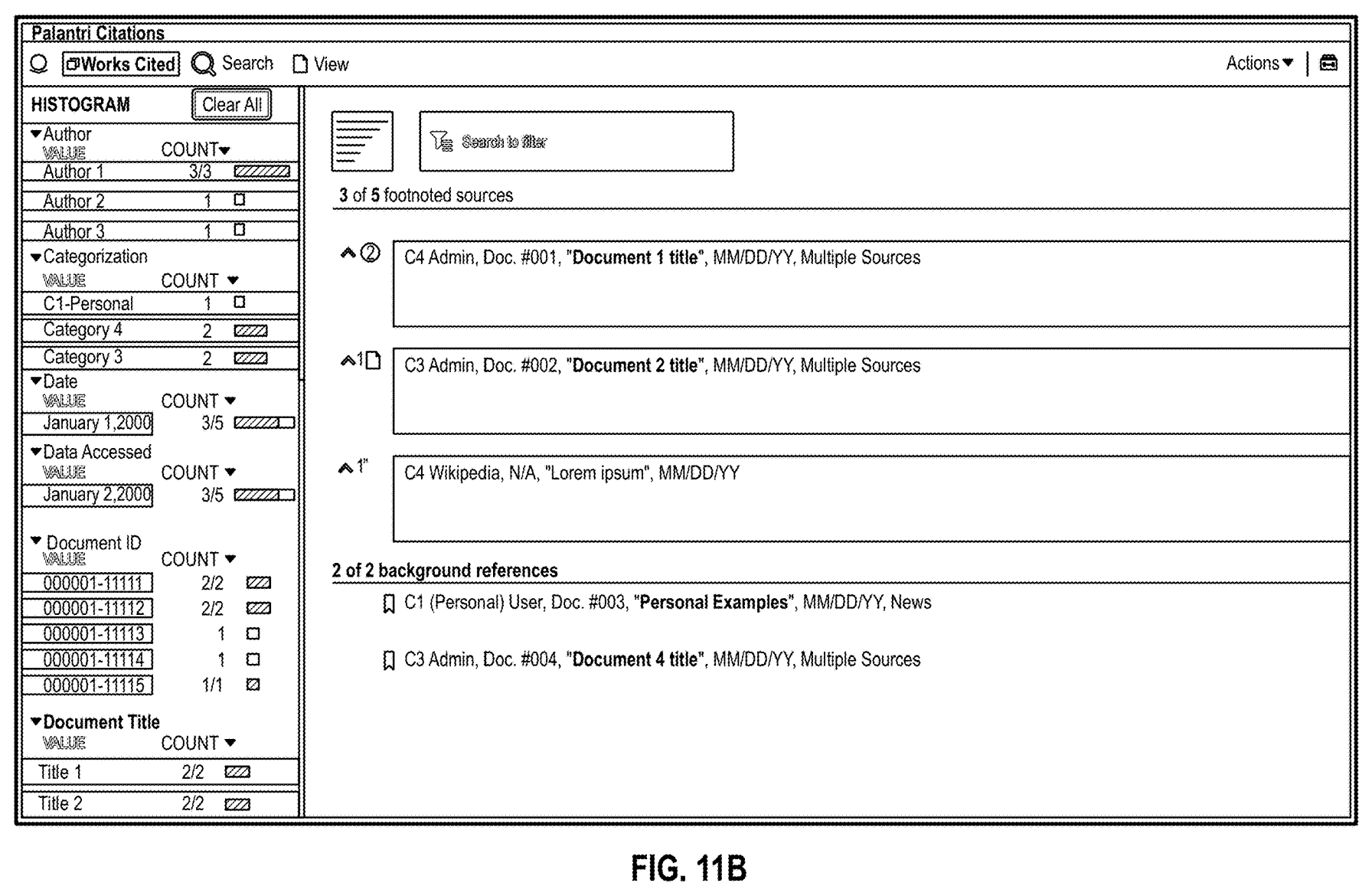

FIG. 11B shows an example histogram displayed alongside a works cited page. The histogram can aggregate data about the source documents linked to a report document. The histogram can help a user to filter and find information. For example, a user can interact with a histogram to see all source documents produced by a publisher, agency, or author. The histogram can also be referenced to gauge the overall analytical integrity of a report document. For example, if the histogram show that too many source documents were written by one author, then a user can determine that the user is over-relied upon, and that more diverse sources can improve the integrity of the report. The histogram can be generated based on the properties of tagged objects.

The histogram can include a section identifying how many source documents were written by different authors. The histogram can also include a section indicating how many source documents fall under different categorizations. The histogram can also include one or more sections indicating the dates that different source documents were published or accessed. The histogram can also include one or more sections indicating how many source documents have certain identification information (e.g., ID numbers, titles). In each section, the histogram can indicate both a total number of unique source documents matching the histogram criteria and a total number of times that a linked source documents match the histogram criteria, such as with different colors or shading of the histogram. For example, two different sections of one source document can be linked to in different parts of a report document. That source document can be counted once uniquely, and the histogram can also show that the source was linked to twice.

Figure 12:
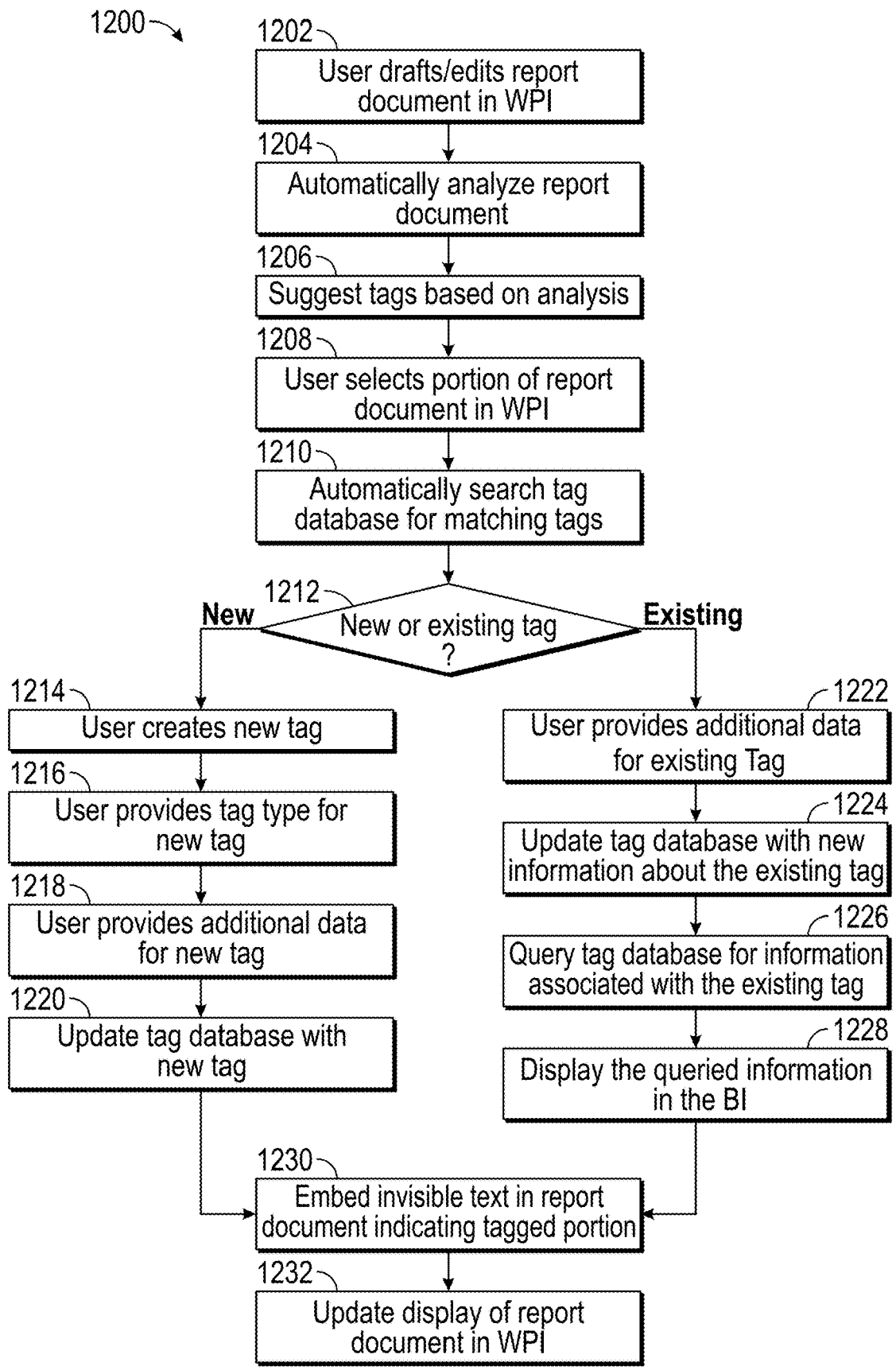
FIG. 12 is a flowchart of an example method of tagging and displaying tags.

FIG. 12 is a flowchart of an example method 1200 of tagging and displaying tags.

At block 1202, a user drafts or edits a report document in a word processing interface. The word processing interface can be configured to simultaneously display both the report document and a browser interface that can be used for sourcing and tagging. In some embodiments, the word processing interface is executed in a browser. In some embodiments, the word processing interface is executed as a standalone application. In some embodiments, the word processing interface is executed as a modification or addition to another application.

At block 1204, the report document is optionally automatically analyzed. This can be performed, for example, by regex matching. This can also be performed, for example, by searching a database for any tags that match words in the report document. The analysis can be automatically performed in response to opening the report document, saving the report document, syncing the report document, editing the report document (e.g., as new words are typed), or other trigger.

At block 1206, tags can optionally be suggested based on the analysis. Tags can be suggested for words or sections of the report document that match a regex query or match existing tags in a database. The user can accept or reject the suggested tags.

At block 1208, a user can select a portion of the report document in the word processing interface for tagging. This can include, for example, highlighting the letters, words, or other portion of the report document to be tagged.

At block 1210, a search of the database is automatically performed to find tags matching the selected portion.

At block 1212, the user can decide whether to select an existing tag or create a new tag.

The user can create a new tag at block 1214. In some embodiments, the new tag can be created as an object model stored inside the report document as a variable. An identifier for the object model can be created inside the report document and associated with the selected text via hidden text. Accordingly, in some embodiments, the tag information can persist and be contained, at least partially, within the report document. In some embodiments, the object model can be instead or additionally stored in a database.

At block 1216, the user can provide a type of tag for the new tag. The browser interface can display a selection of tag types for the user to select from, such as objects, properties, and links. The browser interface receives a selection from the user.

At block 1218, the user can provide additional data for the new tag. The browser interface can receive, from the user, edits to the tag including the tag name, links to the tag, properties of the tag, etc.

At block 1220, the database can be updated with the new tag. In some embodiments, this can include storing a copy of the new tag in the database. In some embodiments, this can include storing, in the database, an indication that the tag exists along with a reference to that the particular report document contains the tag. The database can be automatically updated in response to the creation of the tag. The database can also or alternatively be automatically updated in response to opening the report document, closing the report document, or other triggering action.

If at block 1212 the user selects an existing tag, then at block 1222, the user can provide additional data about the existing tag. This can include modifying the details of the tag, adding links or properties, or changing the selected portion of the report document that the tag is associated with. This can also include disambiguating between multiple existing tags.

At block 1224, the database can be updated with the new additional data about the existing tag. In some embodiments, this can update any tag details in the database. In some embodiments, this can include storing, in the database, an indication that the tag exists along with a reference to that the particular report document contains the tag. The database can be automatically updated in response to the creation of the tag. The database can also or alternatively be automatically updated in response to opening the report document, closing the report document, or other triggering action.

At block 1226, the database can be queried for any information already associated with the existing tag. This can include properties, links, and details from other reports that are tagged with the existing tag.

At block 1228, the queried information can be displayed in the browser interface.

At block 1230, invisible text can be embedded in the report document in order to indicate which portions are tagged.

At block 1232, the word processing interface display is updated to indicate the tagged portion. This can include automatically changing the style, font, etc. of the portion of the report document that is associated with the tag. In response to the creation of a new tag, or in response to applying an existing tag to a new portion of text, the report document can be synchronized with the database.

The report document can be published or saved to a workspace in the database. Publishing a report document can include making the report document, including its tags, accessible to other users who have access to the workspace. In some embodiments, publishing a document can cause the document to become a new object model that is linked to other object models via tags. In some embodiments, publishing the report document and publishing the tags can occur simultaneously or separately. There can be various publication options, including whether how to format and stylize the tags, whether to automatically convert tagged text into links that can be activated to retrieve related information from a database, etc. There can be options to display tags or cite to sources as footnotes or endnotes. There can be an option to automatically generate and append a works cited based on cited sources. There can be options to set the permission level or hide portions protected by certain permission levels. There can also be an option to automatically keep a published document synchronized in a workspace. Synchronizing can allow, for example, edits to tagged information in a first report document to be reflected in a separate report document that has the same tag. For example, editing a separate document that tags 106BC as Cicero's birthday can cause the tag data shown in FIG. 9 to synchronously update the edits to Cicero's birthday. In some embodiments, publishing a report can cause all cited documents to be automatically tagged.

In some embodiments, publishing a report document can cause a copy of the document to be sent to a database, where a detector parses the report document. An information parser can analyze both the visible and invisible data. The data can be extracted to determine what portions of the report document are tagged. A new structure can be created in the database. The new structure can include the tags in a report document, the citations or sources in a report document, and/or document text, including which portions of the document text are associated with which tags and which sources.

Additional Embodiments

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
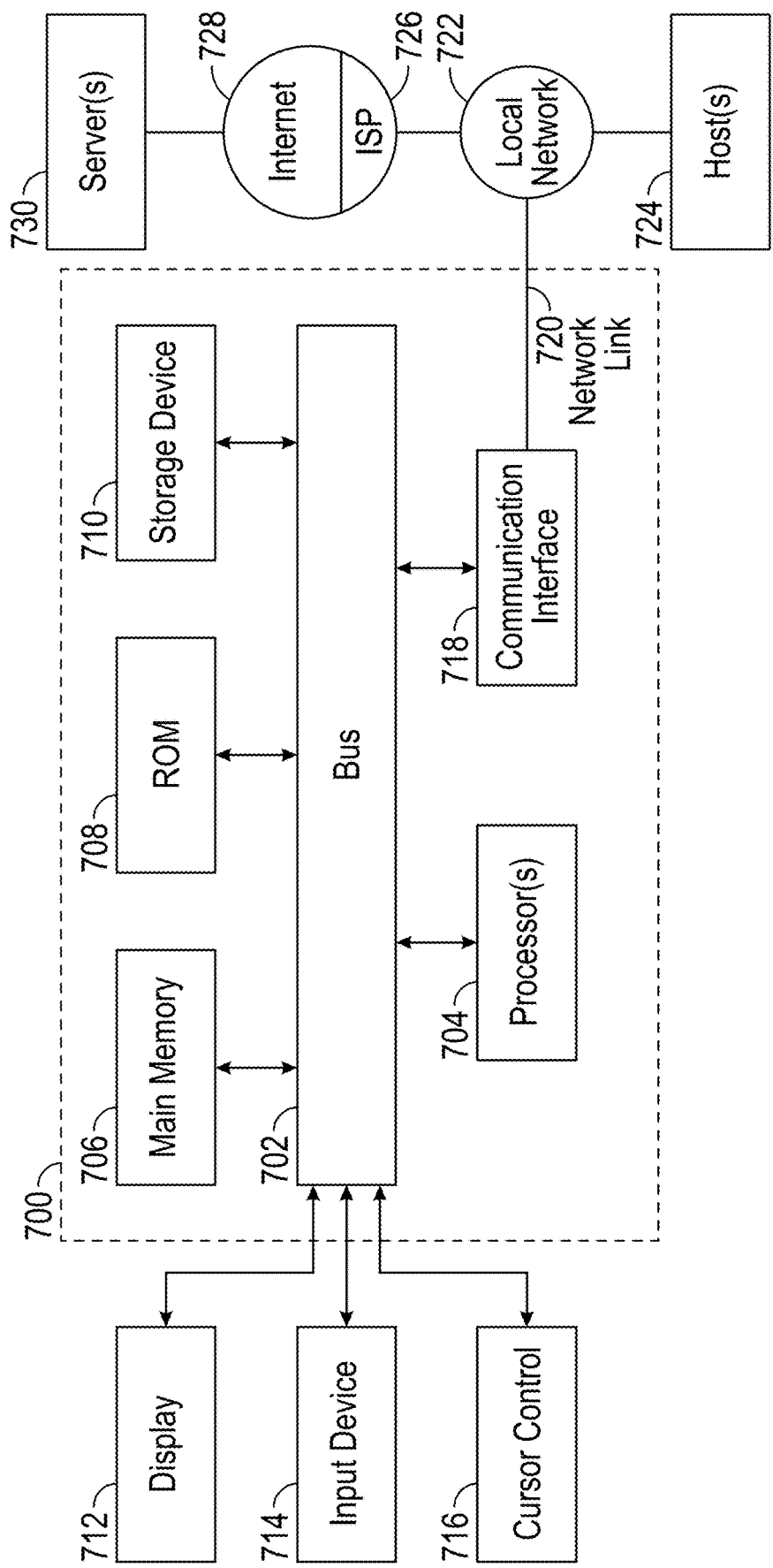
FIG. 7 shows a block diagram that illustrates a computer system which an embodiment can be implemented.

For example, FIG. 7 is a block diagram that illustrates a computer system 700 upon which an embodiment may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 702. Transmission media can also take the form of acoustic or light waves, such as those generated during radio-wave and infra-red data communications.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. In some embodiments, blocks other than those indicated with dotted lines can be removed, modified, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "continuous" as used herein, is a broad term encompassing its plain an ordinary meaning and, as used in reference to various types of activity (for example, scanning, monitoring, logging, and the like), includes without limitation substantially continuous activity and/or activity that may include periodic or intermittent pauses or breaks, but which accomplish the intended purposes described (for example, continuous scanning may include buffering and/or storage of data that is thereafter processed, for example, in batch and/or the like).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   one or more computer readable storage devices configured to store a plurality of computer executable instructions; and
   one or more hardware processors in communication with the one or more computer readable storage devices and configured to execute the plurality of computer executable instructions to cause the computer system to:
      provide user interface data useable to render at least a second section of a user interface, wherein:
         a first section of the user interface is configured to be displayed simultaneously with the second section of the user interface, and
         the first section of the user interface is configured to display a report document;
      receive, through the first section of the user interface, a user-selected portion of the report document;
      receive, through the second section of the user interface, a user-selected portion of a source document;
      based at least in part on receiving, through the second section of the user interface, the user-selected portion of the source document:
         access a pre-existing categorization associated with the user-selected portion of the source document; and
         apply the pre-existing categorization to at least the user-selected portion of the report document;
      embed a link in the report document associated with the user-selected portion of the source document, wherein the link comprises a unique identifier associated with a plurality of data items in an identifier database, wherein the plurality of data items associated with the unique identifier comprises at least a source document identifier based on the user-selected portion of the source document; and
      update the first section of the user interface, such that selecting the user-selected portion of the report document accesses the link to display at least the user-selected portion of the source document in the second section of the user interface.

2. The computer system of claim 1, wherein the plurality of data items associated with the unique identifier in the identifier database further comprises at least one of: a title of the source document, an author of the source document, the user-selected portion of the source document, a document source referenced in the source document, and a publish date of the source document.

3. The computer system of claim 1, wherein the source document identifier comprises a browser link or address to the source document.

4. The computer system of claim 1, wherein the one or more hardware processors are further configured to execute the plurality of computer executable instructions to cause the computer system to:
   generate the unique identifier associated with the plurality of data items in the identifier database.

5. The computer system of claim 1, wherein the one or more hardware processors are further configured to execute the plurality of computer executable instructions to cause the computer system to:
   add a citation to the report document, wherein the citation is associated with the user-selected portion of the source document.

6. The computer system of claim 1, wherein the one or more hardware processors are further configured to execute the plurality of computer executable instructions to cause the computer system to:
   add a footnote to the report document, wherein the footnote is associated with the user-selected portion of the source document.

7. The computer system of claim 1, wherein selecting the user-selected portion of the report document comprises hovering a mouse cursor over the user-selected portion of the report document.

8. The computer system of claim 1, wherein the one or more hardware processors are further configured to execute the plurality of computer executable instructions to cause the computer system to:
   display, via the second section of the user interface, a source listing comprising a view button, and wherein selecting the view button displays the user-selected portion of the source document in the source listing of the second section of the user interface.

9. The computer system of claim 8, wherein the one or more hardware processors are further configured to execute the plurality of computer executable instructions to cause the computer system to:
   receive a selection of the user-selected portion of the source document in the source listing of the second section of the user interface; and
   update the first section of the user interface by selecting the user-selected portion of the report document.

10. The computer system of claim 9, wherein the selection of the user-selected portion of the source document in the source listing of the second section of the user interface comprises hovering a mouse cursor over the user-selected portion of the source document in the source listing.

11. The computer system of claim 1, wherein the one or more hardware processors are further configured to execute the plurality of computer executable instructions to cause the computer system to, in response to receiving, through the second section of the user interface, the user-selected portion of the source document:
   determine a plurality of categorizations applied to the user-selected portion of the report document, wherein the plurality of categorizations are included in a hierarchy;
   determine a highest hierarchical-level categorization from the plurality of categorizations applied to the user-selected portion of the report document; and
   apply the highest hierarchical-level categorization to the user-selected portion of the report document.

12. The computer system of claim 11, wherein the one or more hardware processors are further configured to execute the plurality of computer executable instructions to cause the computer system to:
- determine a categorization for a plurality of portions of the report document, wherein at least one of the plurality of portions comprises the user-selected portion of the report document;
- determine a highest-level categorization from among the categorizations the plurality of portions of the report document; and
- apply the highest-level categorization to the report document.

13. A computer system comprising:
- one or more computer readable storage devices configured to store a plurality of computer executable instructions; and
- one or more hardware processors in communication with the one or more computer readable storage devices and configured to execute the plurality of computer executable instructions to cause the computer system to:
    - provide data usable for rendering a source document in a browser interface, wherein an interactive word processing interface is configured to be simultaneously displayed with the browser interface;
    - receive, through the interactive word processing interface, a user-selected portion of a report document;
    - receive, through the browser interface, a user-selected portion of a source document;
    - based at least in part on receiving, through the browser interface, the user-selected portion of the source document:
        - access a pre-existing categorization associated with the user-selected portion of the source document; and
        - apply the pre-existing categorization to at least the user-selected portion of the report document;
    - in response to a user command in the browser interface, automatically embed a link in the report document associated with the user-selected portion of the source document without further user interaction with the interactive word processing interface, wherein the link comprises a unique identifier associated with a plurality of data items in an identifier database, wherein the plurality of data items associated with the unique identifier comprises at least an identifier of user-selected portion of a source document; and
    - update the report document such that selecting the user-selected portion of the report document accesses the link to display at least the user-selected portion of the source document in the browser interface.

14. The computer system of claim 13, wherein the plurality of data items associated with the unique identifier in the identifier database further comprises at least one of: a title of the source document, an author of the source document, the user-selected portion of the source document, a document source referenced in the source document, and a publish date of the source document.

15. The computer system of claim 13, wherein the one or more hardware processors are further configured to execute the plurality of computer executable instructions to cause the computer system to:
- automatically embed a link in the report document associated with the user-selected portion by executing a function call from the browser interface to the interactive word processing interface.

16. The computer system of claim 13, wherein the unique identifier is hidden text in the report document in the browser interface.

17. The computer system of claim 13, wherein the one or more hardware processors are further configured to execute the plurality of computer executable instructions to cause the computer system to:
- automatically add a citation to the report document in response to a user input received in the browser interface without further interaction from the user in the interactive word processing interface.

18. The computer system of claim 13, wherein the one or more hardware processors are further configured to execute the plurality of computer executable instructions to cause the computer system to:
- automatically show the user-selected portion of the source document in the browser interface in response to a user selection of the user-selected portion of the report document in the interactive word processing interface.

* * * * *